United States Patent
Sugio et al.

(10) Patent No.: US 8,559,737 B2
(45) Date of Patent: Oct. 15, 2013

(54) IMAGE CODING METHOD, IMAGE DECODING METHOD, IMAGE CODING APPARATUS, IMAGE DECODING APPARATUS, AND IMAGE CODING AND DECODING APPARATUS

(75) Inventors: Toshiyasu Sugio, Osaka (JP); Takahiro Nishi, Nara (JP); Youji Shibahara, Osaka (JP); Kyoko Tanikawa, Osaka (JP); Hisao Sasai, Osaka (JP); Toru Matsunobu, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/534,163

(22) Filed: Jun. 27, 2012

(65) Prior Publication Data

US 2013/0004093 A1 Jan. 3, 2013

Related U.S. Application Data

(60) Provisional application No. 61/502,391, filed on Jun. 29, 2011.

(51) Int. Cl.
*G06K 9/36* (2006.01)
(52) U.S. Cl.
USPC ........... 382/236; 382/232; 382/233; 382/250; 382/251; 382/253
(58) Field of Classification Search
USPC ................. 382/236, 232, 233, 250, 251, 253; 375/240.12, 240.15, 240.16; 348/400.1, 401.1, 402.1, 407.1, 410.1, 348/416.1, 418.1, 420.1, 421.1
See application file for complete search history.

(56) References Cited

U.S. PATENT DOCUMENTS

| 2009/0010323 A1 | 1/2009 | Su et al. |
| 2009/0116558 A1 | 5/2009 | Chen et al. |
| 2010/0008422 A1 | 1/2010 | Shimizu et al. |

(Continued)

FOREIGN PATENT DOCUMENTS

| JP | 2009-522986 | 6/2009 |
| JP | 2009-147807 | 7/2009 |

(Continued)

OTHER PUBLICATIONS

International Search Report issued Sep. 18, 2012 in corresponding International Application No. PCT/JP2012/004004.

(Continued)

*Primary Examiner* — Ali Bayat
(74) *Attorney, Agent, or Firm* — Wenderoth, Lind & Ponack, L.L.P.

(57) ABSTRACT

An image coding method includes: (i) determining, for each of one or more associated blocks, whether to add a motion vector of the associated block to a list, and (ii) adding the motion vector of the associated block to the list when determining that the motion vector of the associated block is to be added to the list; selecting, from the list, a motion vector which is to be merged to a current block; and (i) merging the selected motion vector to the current block, and (ii) coding the current block using the merged motion vector as a motion vector of the current block, and in the determining, it is determined that the motion vector of the associated block is not to be added to the list when an associated picture and an associated reference picture match temporally or when a current picture and a current reference picture match temporally.

11 Claims, 39 Drawing Sheets

(56) References Cited

U.S. PATENT DOCUMENTS

| | | | |
|---|---|---|---|
| 2010/0091858 A1* | 4/2010 | Yang | 375/240.13 |
| 2010/0158129 A1 | 6/2010 | Lai et al. | |
| 2011/0206125 A1* | 8/2011 | Chien et al. | 375/240.16 |
| 2012/0008690 A1* | 1/2012 | Lee et al. | 375/240.16 |
| 2012/0189062 A1* | 7/2012 | Sugio et al. | 375/240.16 |
| 2012/0224637 A1* | 9/2012 | Sugio et al. | 375/240.16 |
| 2012/0307903 A1* | 12/2012 | Sugio et al. | 375/240.16 |
| 2012/0328021 A1* | 12/2012 | Sugio et al. | 375/240.16 |
| 2013/0016785 A1* | 1/2013 | Wang et al. | 375/240.16 |

FOREIGN PATENT DOCUMENTS

| | | |
|---|---|---|
| JP | 2010-537484 | 12/2010 |
| JP | 2011-501497 | 1/2011 |
| JP | 2011-77722 | 4/2011 |
| WO | 2007/081926 | 7/2007 |
| WO | 2008/053758 | 5/2008 |
| WO | 2009/023091 | 2/2009 |
| WO | 2009/050658 | 4/2009 |

OTHER PUBLICATIONS

ITU-T Recommendation H.264, "Advanced video coding for generic audiovisual services", Mar. 2010.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, 5th Meeting: Geneva, CH, Mar. 16-23, 2011.

* cited by examiner

| Index | Motion vector |
|---|---|
| 0 | mvA (Neighboring block A) |
| 1 | mvB (Neighboring block B) |
| 2 | mvCol (Co-located block) |
| 3 | Unavailable (Neighboring block C) |
| 4 | mvD (Neighboring block D) |

List

When mvA = mvD

| Index | Motion vector |
|---|---|
| 0 | mvA (Neighboring block A) |
| 1 | mvB (Neighboring block B) |
| 2 | mvCol (Co-located block) |

List

FIG. 33

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 36
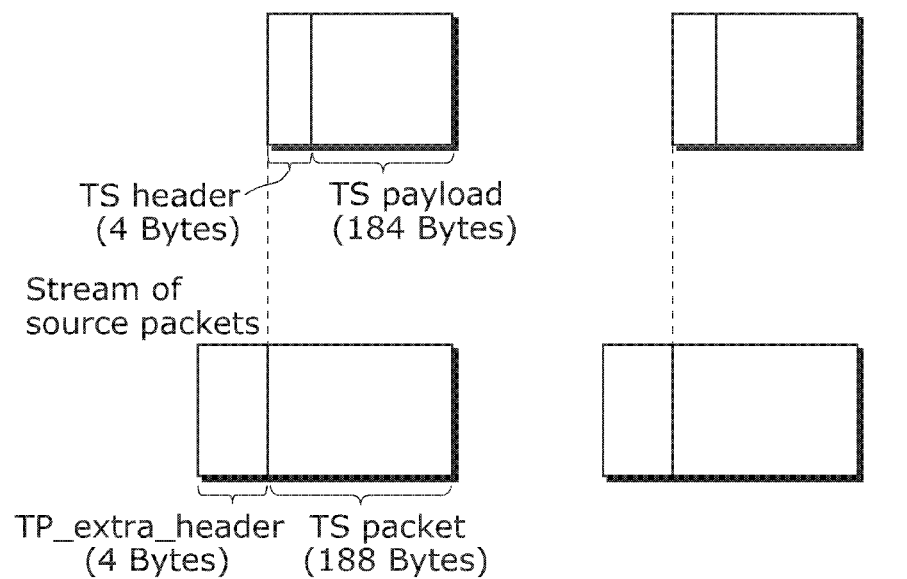
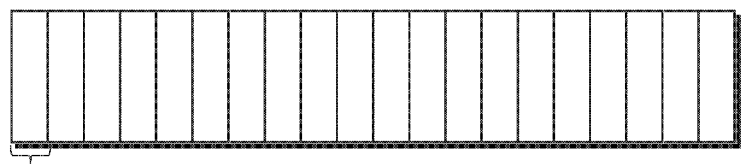

FIG. 44

| Corresponding standard | Driving frequency |
|---|---|
| MPEG-4 AVC | 500 MHz |
| MPEG-2 | 350 MHz |
| ⋮ | ⋮ |

# IMAGE CODING METHOD, IMAGE DECODING METHOD, IMAGE CODING APPARATUS, IMAGE DECODING APPARATUS, AND IMAGE CODING AND DECODING APPARATUS

CROSS REFERENCE TO RELATED APPLICATION

The present application claims the benefit of U.S. Provisional Patent Application No. 61/502,391 filed Jun. 29, 2011. The entire disclosures of the above-identified application, including the specification, drawings and claims are incorporated herein by reference in their entirety.

TECHNICAL FIELD

One or more exemplary embodiments disclosed herein relate generally to image coding methods of coding a plurality of blocks included in a plurality of pictures of an image.

BACKGROUND ART

As conventional techniques related to the image coding methods of coding a plurality of blocks included in a plurality of pictures of an image, some techniques are disclosed by Non Patent Literature 1 and Non Patent Literature 2.

CITATION LIST

Non Patent Literature

[Non Patent Literature 1] ITU-T Recommendation H. 264 "Advanced video coding for generic audiovisual services" March, 2010

[Non Patent Literature 2] JCT-VC "WD3: Working Draft 3 of High-Efficiency Video Coding" JCTVC-E603, March, 2011

SUMMARY OF INVENTION

Technical Problem

However, with the techniques disclosed by Non Patent Literature 1 and Non Patent Literature 2, there is a possibility that an image is not appropriately coded.

Thus, one or more exemplary embodiments provide an image coding method in which an image can be appropriately coded.

Solution to Problem

In one general aspect, the techniques disclosed here feature an image coding method of coding a plurality of blocks included in a plurality of pictures of an image, the image coding method comprising: (i) determining, for each of one or more associated blocks, whether or not to add a motion vector of the associated block to a list, and (ii) adding the motion vector of the associated block to the list when determining that the motion vector of the associated block is to be added to the list, the one or more associated blocks being one or more blocks included in the plurality of blocks; selecting, from the list, a motion vector which is to be merged to a current block that is a block which is included in the plurality of blocks and is different from the one or more associated blocks; and (i) merging, to the current block, the motion vector selected in the selecting, and (ii) coding the current block using the merged motion vector as a motion vector of the current block, wherein, in the determining, it is determined that the motion vector of the associated block is not to be added to the list when an associated picture and an associated reference picture match temporally or when a current picture and a current reference picture match temporally, the associated picture being a picture including the associated block, the associated reference picture being a picture which is referred to using the motion vector of the associated block in coding of the associated block, the current picture being a picture including the current block, and the current reference picture being a picture which is referred to using the motion vector of the current block in the coding of the current block.

It is to be noted that these general or specific aspects may be implemented using a device, system, an integrated circuit, a computer program, or a non-transitory recording medium such as a computer-readable compact disc read-only memory (CD-ROM) and may also be implemented using any combination of such device, system, integrated circuit, computer program, and recording medium.

Advantageous Effects of Invention

According to the present disclosure, images are appropriately coded.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 33 illustrates a structure of multiplexed data.

FIG. 36 shows a structure of TS packets and source packets in the multiplexed data.

FIG. 44 shows an example of a look-up table in which video data standards are associated with driving frequencies.

DESCRIPTION OF EMBODIMENTS

Figure 1:
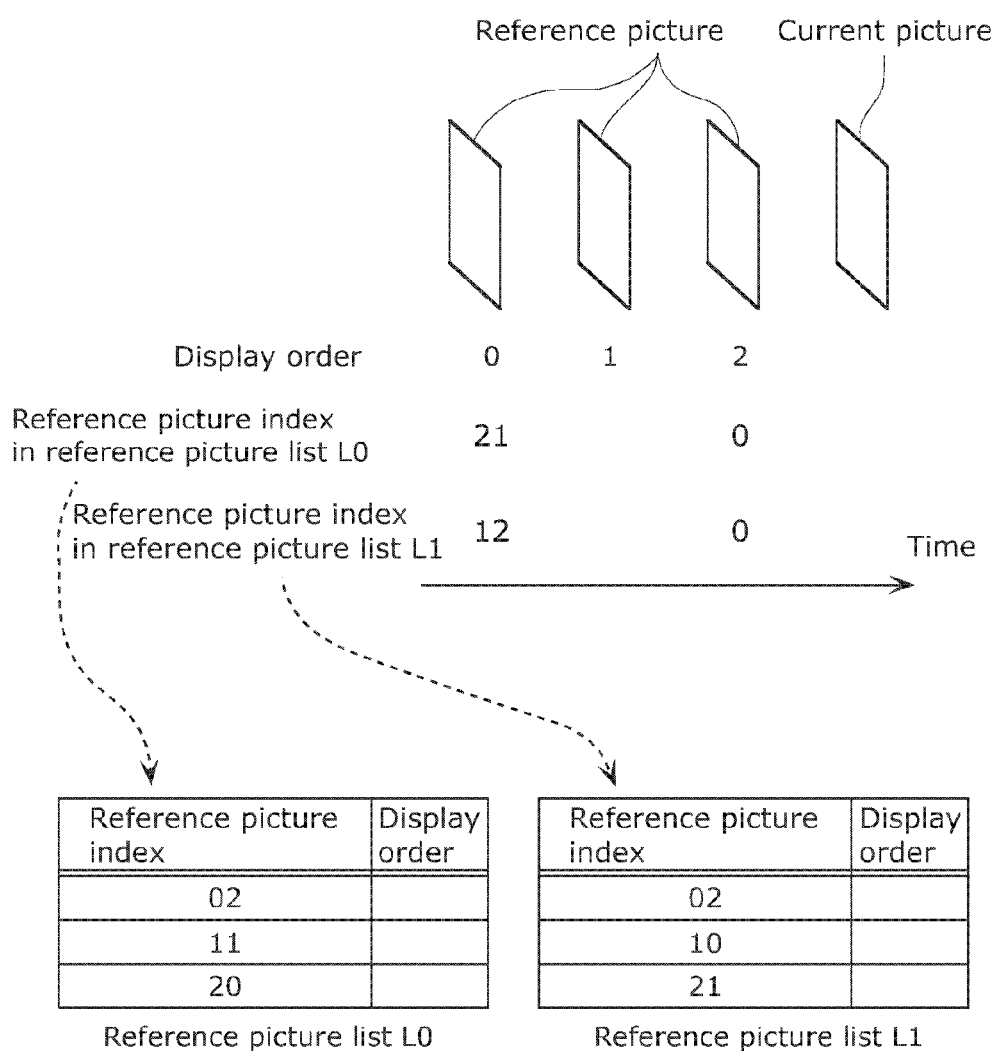
FIG. 1 shows a typical reference picture list.

Underlying Knowledge Forming Basis of the Present Disclosure

Generally, when coding moving pictures, an image coding apparatus compresses the quantity of information by reducing redundancy of the moving pictures in spatial and temporal directions. At this time, the image coding apparatus uses intra prediction (referred to also as intra-picture prediction) as a method of reducing the redundancy in the spatial direction. As a method of reducing the redundancy in the temporal direction, the image coding apparatus uses inter prediction (referred to also as inter-picture prediction) as a method of reducing the redundancy in the temporal direction.

For example, when coding a current picture in the inter prediction, the image coding apparatus uses, as a reference picture, a coded picture located before or after the current picture in display order. The image coding apparatus then derives a motion vector through motion estimation. Using the motion vector, the image coding apparatus then performs motion compensation to generate prediction image data. Subsequently, the image coding apparatus codes a difference between the generated prediction image data and the image data of the current picture, thereby removing the redundancy in the temporal direction.

Furthermore, in the motion estimation, the image coding apparatus calculates a difference between a current block to be coded in the current picture and a block in the reference picture. At this time, the image coding apparatus determines, as a reference block, one of the blocks in the reference picture with which the difference is smallest. Using the current block and the reference block, the image coding apparatus then estimates a motion vector.

The image coding apparatus of H. 264 that is an already-standardized moving picture coding scheme (Non Patent Literature 1) uses three types of pictures: I-picture, P-picture, and B-picture, to reduce the quantity of information.

The H. 264 image coding apparatus codes an I-picture using intra prediction. The image coding apparatus codes a P-picture using inter prediction. When coding a P-picture, the image coding apparatus refers to one coded picture located before or after the P-picture in display order. In other words, the image coding apparatus codes a P-picture using uni-directional prediction.

The image coding apparatus codes a B-picture using inter prediction. When coding a B-picture, the image coding apparatus refers to two coded pictures located before or after the B-picture in display order. In other words, the image coding apparatus codes a B-picture using bi-directional prediction.

It is to be noted that the bi-directional prediction may only represent predicting image data with reference to one reference picture located in each of before and after the B-picture. Furthermore, the bi-directional prediction may include predicting image data with reference to two reference pictures located in one of before and after the B-picture. In the latter case, the bi-direction prediction may be represented as bi-prediction.

In the inter prediction, the image coding apparatus generates a reference picture list for specifying a reference picture. The image coding apparatus assigns, in the reference picture list, a reference picture index to the reference picture which is referred to in the inter prediction. In coding a B-picture, the image coding apparatus refers to two pictures. Accordingly, the image coding apparatus holds two reference picture lists L0 and L1.

FIG. 1 shows an example of the reference picture list. Reference picture lists L0 and L1 shown in FIG. 1 are an example of the two reference picture lists in the bi-directional prediction.

The image coding apparatus assigns, in the reference picture list L0, a reference picture index 0 to a reference picture which is the second in display order. Furthermore, the image coding apparatus assigns a reference picture index 1 to a reference picture which is the first in display order. Furthermore, the image coding apparatus assigns a reference picture index 2 to a reference picture which is the 0-th in display order. In short, the image coding apparatus assigns reference picture indices in descending order of closeness, in display order, to the current picture.

Meanwhile, the image coding apparatus assigns, in the reference picture list L1, a reference picture index 0 to a reference picture which is the second in display order. Furthermore, the image coding apparatus assigns a reference picture index 2 to a reference picture which is the first in display order. Furthermore, the image coding apparatus assigns a reference picture index 1 to a reference picture which is the 0-th in display order.

As such, the image coding apparatus may assign, for each reference picture list, a different reference picture index to the same reference picture. Alternatively, the image coding apparatus may assign the same reference picture index to the same reference picture.

In addition, it may be possible that the reference picture list L0 correspond to a first prediction direction while the reference picture list L1 correspond to a second prediction direction. Here, the first prediction direction and the second prediction direction are different from each other, one of which is forward and the other of which is backward. Typically, the reference picture list L0 is used to specify a reference picture which is located before the current picture in display order, and the reference picture list L1 is used to specify a reference picture which is located after the current picture in display order.

Furthermore, the inter prediction has a plurality of coding modes for predicting image data of the current block. In some cases, such coding mode indicates not only the inter prediction or the intra prediction, but a detailed mode which is included in the inter prediction or the intra prediction. The image coding apparatus selects, from among the coding modes, a coding mode which is to be applied in the prediction of image data of the current block.

For example, the image coding apparatus selects, as the coding mode, bi-directional prediction in which a prediction image is generated with reference to two pictures located before or after the current picture in display order. Alternatively, for example, the image coding apparatus selects, as the coding mode, uni-directional prediction in which a prediction image is generated with reference to one picture located before or after the current picture in display order. Alternatively, the image coding apparatus selects a coding mode called a temporal direct mode.

Figure 2:
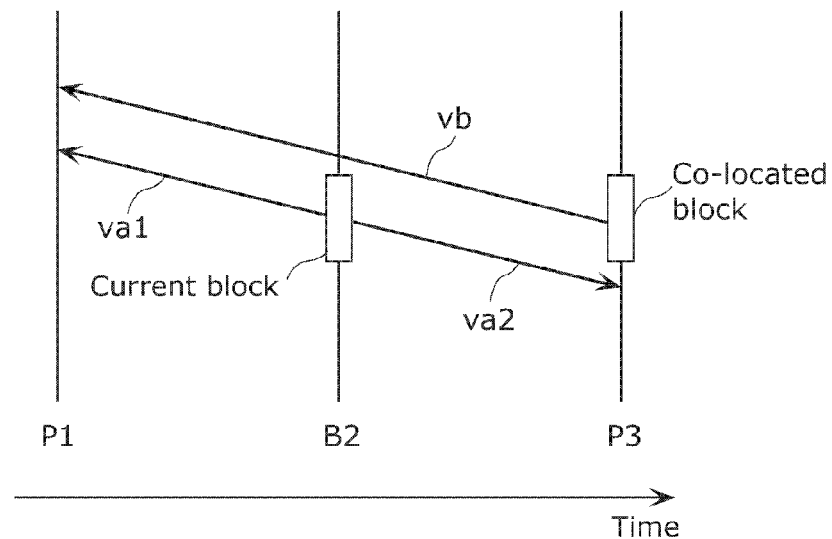
FIG. 2 shows a typical temporal direct mode.

FIG. 2 shows the temporal direct mode. FIG. 2 shows a case where the current block in a picture B2 is coded using a motion vector obtained in the temporal direct mode.

In this case, the image coding apparatus uses a motion vector vb used to code a co-located block. The co-located block is included in a picture P3 that is a reference picture located after the picture B2 in display order. Furthermore, the position of the co-located block agrees with the position of the current block. The motion vector vb of the co-located block points to a picture P1.

It is to be noted that the position of the co-located block does not have to completely agree with the position of a block to be processed, such as the current block. For example, the upper left position of the co-located block may agree with the lower right position of the block to be processed. In other words, the co-located block may be located spatially to the lower right of the block to be processed.

The image coding apparatus specifies two reference blocks for the current block from both the picture P1 that is a preceding reference picture, and the picture P3 that is a succeeding reference picture, using two motion vectors va1 and va2 parallel to the motion vector vb. The image coding apparatus then codes the current block in the bi-direction prediction.

Specifically, the image coding apparatus uses the motion vector va1 for the picture P1 and the motion vector va2 for the picture P3. The image coding apparatus then specifies the two reference blocks and codes the current block in the bi-directional prediction.

The two motion vectors va1 and va2 are parallel to the motion vector vb. The image coding apparatus scales the motion vector vb according to the ratio of temporal distance among the three pictures P1, B2, and P3, thereby obtaining the two motion vectors va1 and va2.

In addition, a discussion has been made on using a merge mode at the time of coding the motion vector of the current block in the B picture or the P picture (Non Patent Literature 2). The image coding apparatus which uses the merge mode generates a plurality of candidate merge vectors from, for example, neighboring blocks that are adjacent to the current block. The image coding apparatus then selects a merge vector from among the plurality of candidates.

The image coding apparatus then codes the current block using the selected merge vector. Specifically, the image coding apparatus merges (copies) a motion vector from a neighboring block, which is adjacent to the current block, to the current block, and codes the current block using the merged motion vector. The use of the motion vector of the neighboring block or the like allows the image coding apparatus to reduce a code amount and a calculation amount for the motion vector.

Furthermore, the image coding apparatus adds, to a bitstream, an index of the selected merge vector (which is referred to also as a merge vector index or a merge block index). Thus, an image decoding apparatus can select the same merge vector at the time of decoding.

Figure 3:
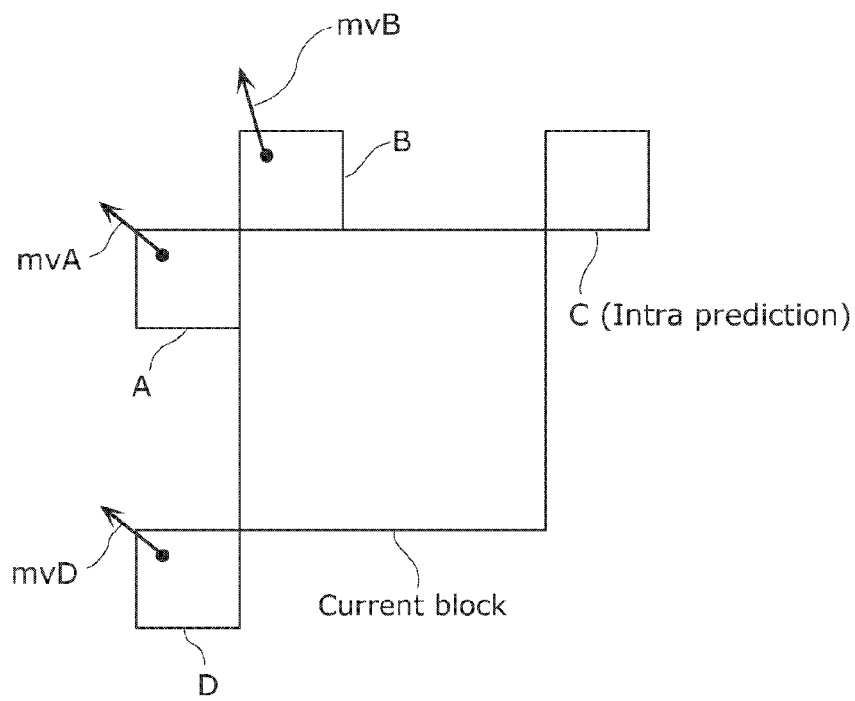
FIG. 3 shows relationships between a current block and neighboring blocks.

FIG. 3 is a view for explaining the merge mode and shows the relationships between the current block and the neighboring blocks. In FIG. 3, a neighboring block A is a coded block which is adjacent to the left of the current block, a neighboring block B is a coded block which is adjacent to the top of the current block, a neighboring block C is a coded block which is adjacent to the upper right of the current block, and a neighboring block D is a coded block which is adjacent to the lower left of the current block.

The neighboring block A has a motion vector mvA. This means that the neighboring block A has been coded using the motion vector mvA. The neighboring block B has a motion vector mvB. This means that the neighboring block B has been coded using the motion vector mvB. The neighboring block C has been coded in the intra prediction. Thus, the neighboring block C has no motion vector. The neighboring block D has a motion vector mvD. This means that the neighboring block D has been coded using the motion vector mvD.

The image coding apparatus selects a merge vector from among the plurality of motion vectors mvA, mvB, and mvD, and so on. In some cases, the image coding apparatus selects, as the merge vector, a motion vector obtained in the temporal direct mode. The motion vector obtained in the temporal direct mode originates from a co-located block of the current block.

The image coding apparatus selects, from among the plurality of candidates, the merge vector with which the current block can be most efficiently coded. For example, the image coding apparatus selects, as the merge vector, the candidate which points to a reference block closest to the current block. The image coding apparatus then adds, to a bitstream, an index which indicates the selected merge vector.

More specifically, for example, when coding the motion vector of the current block, the image coding apparatus selects the motion vector mvA of the neighboring block A as the merge vector. The image coding apparatus then adds, to the bitstream, one of a plurality of index values which indicates that the motion vector mvA has been used. By so doing, the image coding apparatus is capable of reducing the quantity of information of the motion vector of the current block.

Figure 4:
FIG. 4 shows a list which contains candidate merge vectors.

FIG. 4 shows an example of a list which contains candidate merge vectors. Furthermore, the image coding apparatus deletes, from the list, a candidate which cannot be used (hereinafter referred to as an unavailable candidate). Furthermore, the image coding apparatus deletes, from the list, a candidate which has the same value as other candidates (hereinafter referred to as a duplicate candidate). A decrease in the number of candidates leads to a decrease in the code amount of indices.

For example, when a neighboring block is a block coded in the intra prediction, the neighboring block has no motion vector. In this case, the image coding apparatus cannot obtain the merge vector from such neighboring block. Thus, in this case, the image coding apparatus deletes the candidate of such neighboring block from the list.

Furthermore, when a neighboring block is located outside a slice or outside a picture, the image coding apparatus cannot obtain the merge vector from such neighboring block. Furthermore, when a neighboring block has not yet been coded, the image coding apparatus cannot obtain the merge vector from such neighboring block. In these cases, the image coding apparatus deletes the candidate of such neighboring block from the list.

In the example of FIG. 4, since the neighboring block C has been coded in the intra prediction, a candidate identified by the index value is an unavailable candidate. Accordingly, the image coding apparatus deletes the candidate from the list.

Furthermore, the motion vector mvD of the neighboring block D agrees with the motion vector mvA of the neighboring block A. Accordingly, a candidate identified by the index value 4 is deleted from the list. Ultimately, the number of candidates is 3.

Figure 5:
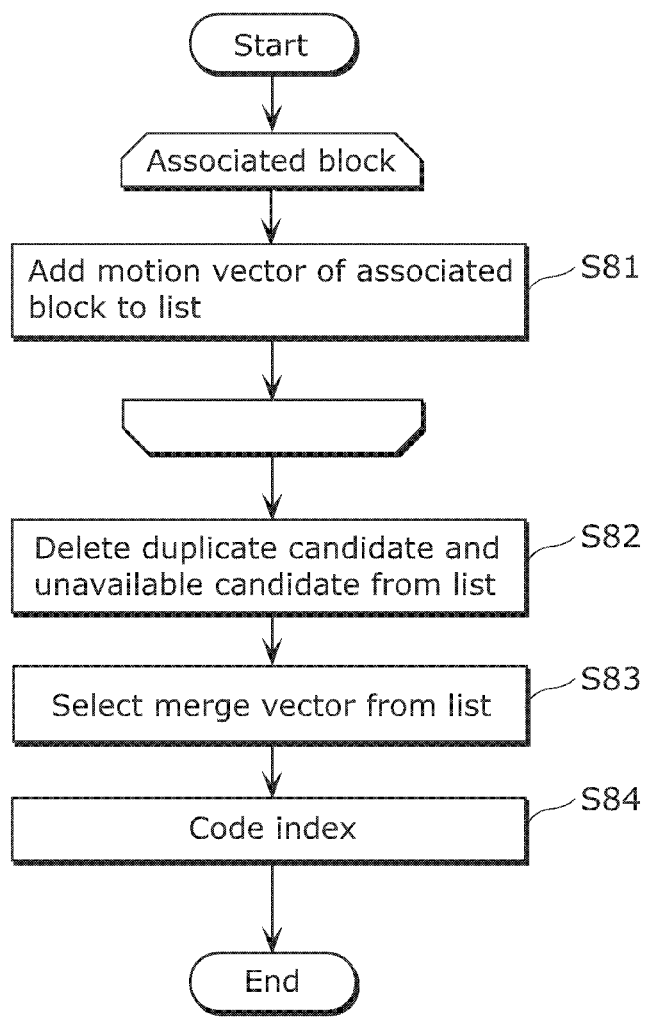
FIG. 5 shows an operation of a typical image coding apparatus.

FIG. 5 is a flowchart showing an operation of the image coding apparatus. First, the image coding apparatus adds a motion vector of each of a plurality of associated blocks to the list (S81). The associated block is a neighboring block, a co-located block, or the like.

Next, the image coding apparatus deletes, from the list, a duplicate candidate and an unavailable candidate (S82). Next, the image coding apparatus selects a merge vector from the list (S83). Next, the image coding apparatus codes an index assigned to the selected merge vector (S84).

Figure 6:
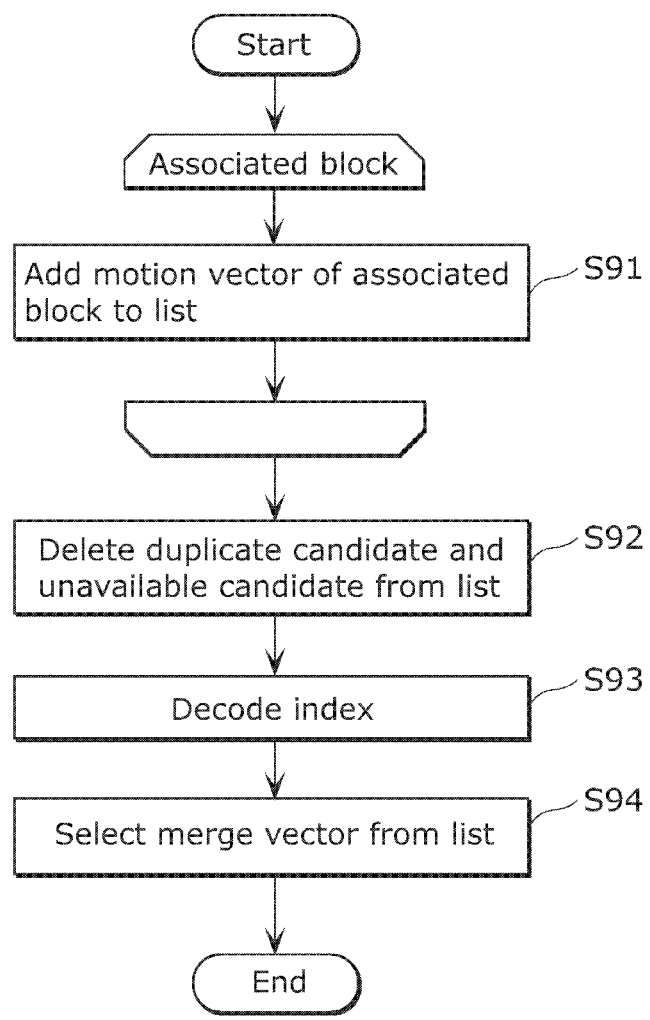
FIG. 6 shows an operation of a typical image decoding apparatus.

FIG. 6 is a flowchart showing an operation of the image decoding apparatus. The image decoding apparatus adds a motion vector of each of the plurality of associated blocks to the list (S91).

Next, the image decoding apparatus deletes, from the list, a duplicate candidate and an unavailable candidate (S92). Next, the image decoding apparatus decodes the index coded by the image coding apparatus (S93). The image decoding apparatus selects a merge vector based on the decoded index (S94). The image decoding apparatus then decodes the current block using the selected merge vector.

However, in the conventional merge mode, the fact that a block is coded with reference to a picture which temporally matches the block is not taken into account. For example, the image coding apparatus which adopts the multiview video coding (MVC) may code a picture in a non-base view with reference to a picture in a base view. In this case, the two pictures in a reference relationship (the picture in the base view and the picture in the non-base view) match temporally.

More specifically, in some cases, a co-located block is coded using a reference picture, and the co-located block and the reference picture are included in views different from each other. In such a case, the co-located block is coded using the reference picture which temporally matches the co-located block.

In this case, since a temporal distance of the motion vector is 0, it is not possible for the image coding apparatus to scale the motion vector based on the temporal distance. Thus, the image coding apparatus cannot obtain the motion vector obtained in the temporal direct mode. This requires the image coding apparatus to switch the operation by a special flag or the like when there is a possibility that a block is coded with reference to a picture which temporally matches the block. However, switching the operation by a special flag or the like is inefficient from the perspective of coding efficiency.

Therefore, the image coding method in which an image can be appropriately coded even when there is a possibility that a block is coded with reference to a picture which temporally matches a picture including the block contributes to the improvement of coding efficiency.

In one general aspect, the techniques disclosed here feature an image coding method of coding a plurality of blocks included in a plurality of pictures of an image, the image coding method comprising: (i) determining, for each of one or more associated blocks, whether or not to add a motion vector of the associated block to a list, and (ii) adding the motion vector of the associated block to the list when determining that the motion vector of the associated block is to be added to the list, the one or more associated blocks being one or more blocks included in the plurality of blocks; selecting, from the list, a motion vector which is to be merged to a current block that is a block which is included in the plurality of blocks and is different from the one or more associated blocks; and (i) merging, to the current block, the motion vector selected in the selecting, and (ii) coding the current block using the merged motion vector as a motion vector of the current block, wherein, in the determining, it is determined that the motion vector of the associated block is not to be added to the list when an associated picture and an associated reference picture match temporally or when a current picture and a current reference picture match temporally, the associated picture being a picture including the associated block, the associated reference picture being a picture which is referred to using the motion vector of the associated block in coding of the associated block, the current picture being a picture including the current block, and the current reference picture being a picture which is referred to using the motion vector of the current block in the coding of the current block.

By so doing, an image can be appropriately coded even when there is a possibility that a block is coded with reference to a picture which temporally matches a picture including the block.

Furthermore, for example, in the determining, it may be determined that the motion vector of the associated block is not to be added to the list when a view including the associated picture is different from a view including the associated reference picture or when a view including the current picture is different from a view including the current reference picture, so as to determine that the motion vector of the associated block is not to be added to the list when the associated picture and the associated reference picture match temporally or when the current picture and the current reference picture match temporally.

By so doing, an image can be appropriately coded even when there is a possibility that a block is coded with reference to a picture which is included in a view different from a view which includes the block.

Furthermore, for example, in the determining, it may be determined that the motion vector of the associated block is not to be added to the list when a display order of the associated picture and a display order of the associated reference picture match or when a display order of the current picture and a display order of the current reference picture match, so as to determine that the motion vector of the associated block is not to be added to the list when the associated picture and the associated reference picture match temporally or when the current picture and the current reference picture match temporally.

By so doing, an image can be appropriately coded even when there is a possibility that the display order of a picture which includes a block and the display order of a reference picture for the block match.

Furthermore, for example, in the determining, it may be determined that the motion vector of the associated block is not to be added to the list when the associated picture and the associated reference picture match temporally or when the current picture and the current associated reference picture match temporally except when the associated picture and the associated reference picture match temporally and the current picture and the current reference picture match temporally.

By so doing, a motion vector which does not have to be scaled can be used as a candidate motion vector to be merged. Thus, images are appropriately coded.

Furthermore, for example, in the determining, it may be determined that the motion vector of the associated block is not to be added to the list when only one of the following is true: a view including the associated picture is different from a view including the associated reference picture; and a view including the current picture is different from a view including the current reference picture, so as to determine that the motion vector of the associated block is not to be added to the list when the associated picture and the associated reference picture match temporally or when the current picture and the current reference picture match temporally except when the associated picture and the associated reference picture match temporally and the current picture and the current reference picture match temporally.

By so doing, an image can be appropriately coded even when there is a possibility that only one of the current block and the associated block is coded in inter-view prediction.

Furthermore, for example, in the adding, a predetermined motion vector may be added to the list when the current picture and the current reference picture match temporally.

By so doing, a predetermined motion vector is used as a candidate motion vector to be merged. This suppresses a reduction in the number of candidates.

Furthermore, for example, it may be possible that in the adding, the predetermined motion vector which is attached to a header of a coded stream may be added to the list.

By so doing, in both the coding process and the decoding process, the same motion vector can be added to the list. Thus, images are appropriately coded.

Furthermore, for example, in the adding, a disparity vector indicating a direction and a magnitude of disparity may be added to the list as the predetermined motion vector.

By so doing, a disparity vector is used as a candidate motion vector to be merged. When the current picture and the current reference picture match temporally, inter-view prediction is likely to be used to code the current block. In such a case, a disparity vector is used as a candidate motion vector to be merged, with the result that images are appropriately coded.

Furthermore, for example, it may be possible that, in the coding, the current block be coded using a motion vector resulting from motion estimation, and the motion vector resulting from the motion estimation be coded when no motion vector is added to the list.

By so doing, even when there is no candidate motion vector to be merged, the motion vector is coded. Thus, images are appropriately coded.

Furthermore, for example, it may be possible that, in the adding, the motion vector of the associated block be scaled using a ratio of a temporal distance between the current picture and the current reference picture to a temporal distance between the associated picture and the associated reference picture, and the scaled motion vector be added to the list.

By so doing, the motion vector of the associated block is scaled using a temporal distance. A scaled motion vector is then used as a candidate motion vector to be merged, with the result that images are appropriately coded.

Furthermore, the techniques disclosed here feature an image decoding method of decoding a plurality of blocks included in a plurality of pictures of an image, the image decoding method comprising: (i) determining, for each of one or more associated blocks, whether or not to add a motion vector of the associated block to a list, and (ii) adding the motion vector of the associated block to the list when determining that the motion vector of the associated block is to be added to the list, the one or more associated blocks being one or more blocks included in the plurality of blocks; selecting, from the list, a motion vector which is to be merged to a current block that is a block which is included in the plurality of blocks and is different from the one or more associated blocks; and (i) merging, to the current block, the motion vector selected in the selecting, and (ii) decoding the current block using the merged motion vector as a motion vector of the current block, wherein, in the determining, it is determined that the motion vector of the associated block is not to be added to the list when an associated picture and an associated reference picture match temporally or when a current picture and a current reference picture match temporally, the associated picture being a picture including the associated block, the associated reference picture being a picture which is referred to using the motion vector of the associated block in decoding of the associated block, the current picture being a picture including the current block, and the current reference picture being a picture which is referred to using the motion vector of the current block in the decoding of the current block.

By so doing, an image can be appropriately decoded even when there is a possibility that a block is decoded with reference to a picture which temporally matches a picture including the block.

For example, in the determining, it may be determined that the motion vector of the associated block is not to be added to the list when a view including the associated picture is different from a view including the associated reference picture or when a view including the current picture is different from a view including the current reference picture, so as to determine that the motion vector of the associated block is not to be added to the list when the associated picture and the associated reference picture match temporally or when the current picture and the current reference picture match temporally.

By so doing, an image can be appropriately decoded even when there is a possibility that a block is decoded with reference to a picture which is included in a view different from a view which includes the block.

Furthermore, for example, in the determining, it may be determined that the motion vector of the associated block is not to be added to the list when a display order of the associated picture and a display order of the associated reference picture match or when a display order of the current picture and a display order of the current reference picture match, so as to determine that the motion vector of the associated block is not to be added to the list when the associated picture and the associated reference picture match temporally or when the current picture and the current reference picture match temporally.

By so doing, an image can be appropriately decoded even when there is a possibility that the display order of a picture which includes a block and the display order of a reference picture for the block match.

Furthermore, for example, in the determining, it may be determined that the motion vector of the associated block is not to be added to the list when the associated picture and the associated reference picture match temporally or when the current picture and the current associated reference picture match temporally except when the associated picture and the associated reference picture match temporally and the current picture and the current reference picture match temporally.

By so doing, a motion vector which does not have to be scaled can be used as a candidate motion vector to be merged. Thus, images are appropriately decoded.

Furthermore, for example, in the determining, it may be determined that the motion vector of the associated block is not to be added to the list when only one of the following is true: a view including the associated picture is different from a view including the associated reference picture; and a view including the current picture is different from a view including the current reference picture, so as to determine that the motion vector of the associated block is not to be added to the list when the associated picture and the associated reference picture match temporally or when the current picture and the current reference picture match temporally except when the associated picture and the associated reference picture match temporally and the current picture and the current reference picture match temporally.

By so doing, an image can be appropriately decoded even when there is a possibility that only one of the current block and the associated block is decoded in inter-view prediction.

Furthermore, for example, in the adding, a predetermined motion vector may be added to the list when the current picture and the current reference picture match temporally.

By so doing, a predetermined motion vector is used as a candidate motion vector to be merged. This suppresses a reduction in the number of candidates.

Furthermore, for example, in the adding, the predetermined motion vector which has been attached to a header of a coded stream may be added to the list.

By so doing, in both the coding process and the decoding process, the same motion vector can be added to the list. Thus, images are appropriately decoded.

Furthermore, for example, in the adding, a disparity vector indicating a direction and a magnitude of disparity may be added to the list as the predetermined motion vector.

By so doing, a disparity vector is used as a candidate motion vector to be merged. When the current picture and the current reference picture match temporally, inter-view prediction is likely to be used to decode the current block. In such a case, a disparity vector is used as a candidate motion vector to be merged, with the result that images are appropriately decoded.

Furthermore, for example, it may be possible that, in the decoding, the motion vector of the current block be decoded, and the current block be decoded using the decoded motion vector when no motion vector is added to the list.

By so doing, even when there is no candidate motion vector to be merged, the motion vector is decoded. Thus, images are appropriately decoded.

Furthermore, for example, it may be possible that, in the adding, the motion vector of the associated block be scaled using a ratio of a temporal distance between the current picture and the current reference picture to a temporal distance between the associated picture and the associated reference picture, and the scaled motion vector be added to the list.

By so doing, the motion vector of the associated block is scaled using a temporal distance. A scaled motion vector is then used as a candidate motion vector to be merged, with the result that images are appropriately decoded.

Furthermore, these general or specific aspects may be implemented using a device, system, an integrated circuit, a computer program, or a non-transitory recording medium such as a computer-readable compact disc read-only memory (CD-ROM) and may also be implemented using any combination of such device, system, integrated circuit, computer program, and recording medium.

Hereinafter, an image coding apparatus and an image decoding apparatus according to certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the inventive concept disclosed herein. Therefore, among the structural elements in the following exemplary embodiments, structural elements not recited in any one of the independent claims defining the most generic part of the inventive concept are described as arbitrary structural elements.

Here, a current block to be coded, a current block to be decoded, and a current block to be processed in the following exemplary embodiments are each referred to also as a current block. Furthermore, a current picture to be coded, a current picture to be decoded, and a current picture to be processed are each referred to also as a current picture.

In addition, images in the following exemplary embodiments may be moving pictures, multiview video, a set of one or more pictures, and part of a picture.

A block in the following exemplary embodiments may be a block called a coding unit (CU), a block called a prediction unit (PU), a block called a macroblock, and other blocks.

A motion vector in inter prediction has a direction and a magnitude and is different from a prediction direction in intra prediction.

(Embodiment 1)

Figure 7:
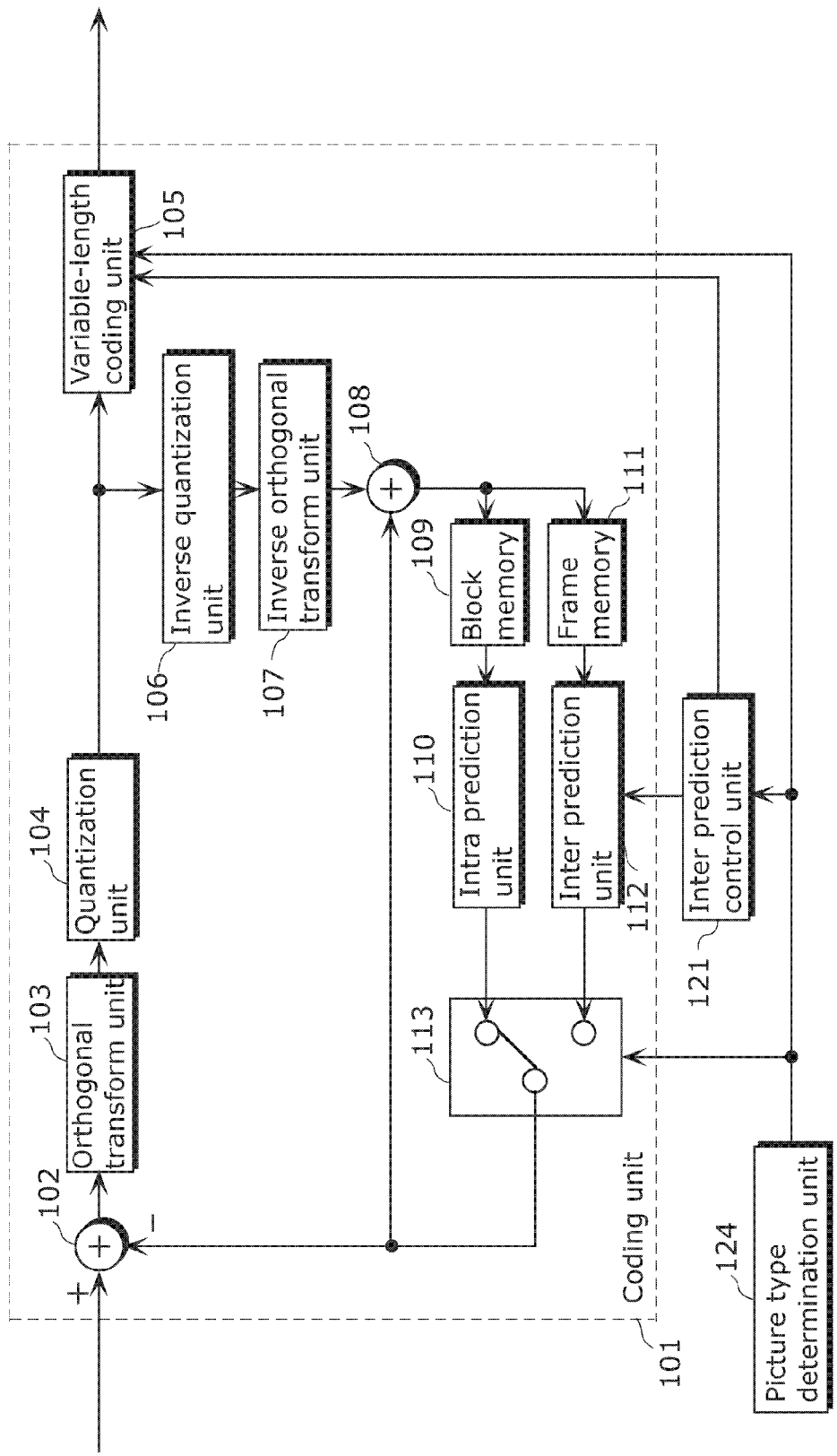
FIG. 7 shows a configuration of an image coding apparatus according to Embodiment 1.

FIG. 7 is a structural diagram showing an image coding apparatus according to this embodiment. The image coding apparatus shown in FIG. 7 includes a coding unit 101, an inter prediction control unit 121, and a picture type determination unit 124. Furthermore, the coding unit 101 includes a subtraction unit 102, an orthogonal transform unit 103, a quantization unit 104, a variable-length coding unit 105, an inverse quantization unit 106, an inverse orthogonal transform unit 107, an addition unit 108, a block memory 109, an intra prediction unit 110, a frame memory 111, an inter prediction unit 112, and a switch 113.

The subtraction unit 102 subtracts prediction image data from input image data and outputs prediction error data. The orthogonal transform unit 103 transforms the prediction error data from an image domain into a frequency domain. The quantization unit 104 performs a quantization process on the prediction error data transformed into the frequency domain.

The inverse quantization unit 106 performs an inverse quantization process on the prediction error data on which the quantization process has been performed by the quantization unit 104. The inverse orthogonal transform unit 107 transforms, from the frequency domain into the image domain, the prediction error data on which the inverse quantization process has been performed. The addition unit 108 adds the prediction error data and the prediction image data and outputs reconstructed image data. The block memory 109 is a memory for storing the reconstructed image data on a per block basis. The frame memory 111 is a memory for storing the reconstructed image data on a per frame basis.

The intra prediction unit 110 performs intra prediction using the per-block reconstructed image data stored in the block memory 109. By so doing, the intra prediction unit 110 generates prediction image data for a current block to be coded. The inter prediction unit 112 performs inter prediction using the per-frame reconstructed image data stored in the frame memory 111 and a motion vector derived from motion estimation. By so doing, the inter prediction unit 112 generates prediction image data for the current block. Alternatively, the inter prediction unit 112 generates prediction image data using a merge vector. The switch 113 switches a coding mode to the intra prediction or the inter prediction.

The picture type determination unit 124 determines which one of the following pictures types: I-picture, B-picture, and P-picture, is to be used in coding the input image data, and generates picture type information.

The inter prediction control unit 121 selects a merge vector from among one or more candidates. Processing which is performed by the inter prediction control unit 121 will be later described in detail.

The variable-length coding unit 105 performs a variable-length coding process on the prediction error data on which the quantization process has been performed, an index which represents a merge vector, the picture type information, and the like. By so doing, the variable-length coding unit 105 generates a bitstream. It is to be noted that, when no merge vector has been selected, the variable-length coding unit 105 codes the motion vector derived from the motion estimation.

FIG. 7 is a structural diagram showing an example of the image coding apparatus according to this embodiment. A specific structural embodiment is not limited to the configuration shown in FIG. 7. For example, in the case where the picture type is predetermined, the picture type determination unit 124 may be excluded. The coding unit 101 does not need to include a plurality of structural elements. The coding unit 101 may code an image without performing the frequency transform, the quantization, the inverse frequency transform, the inverse quantization, the intra prediction, or the like.

Figure 8:
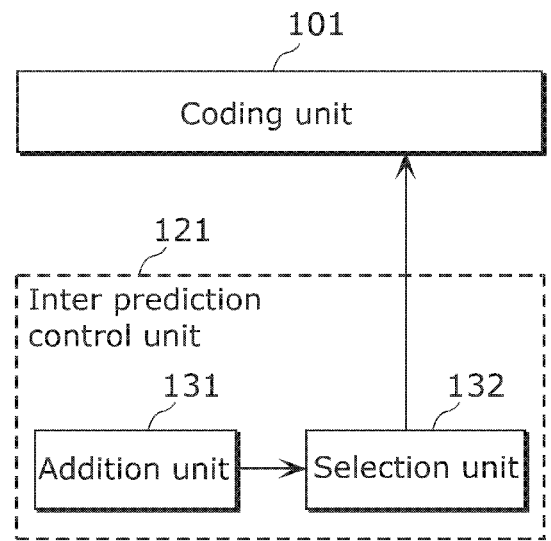
FIG. 8 shows a configuration of main structural elements of the image coding apparatus according to Embodiment 1.

FIG. 8 shows a configuration of main structural elements of the image coding apparatus shown in FIG. 7. The image coding apparatus shown in FIG. 8 includes the coding unit 101 and the inter prediction control unit 121. The inter prediction control unit 121 includes an addition unit 131 and a selection unit 132.

The addition unit 131 selectively adds a motion vector of each of one or more associated blocks to a list. Specifically, the adding unit 131 selects, for each of the one or more associated blocks, whether or not to add the motion vector of the associated block to the list, and adds, to the list, the motion vector selected as a motion vector to be added. The addition unit 131 may add all the one or more motion vectors of the one or more associated blocks to the list and may alternatively add part of the one or more motion vectors of the one or more associated blocks to the list.

The associated block is a coded neighboring block, a coded co-located block, or the like. Specifically, the associated bock may be a block which is included in the current picture and spatially adjacent to the current block. Alternatively, the associated block may be a block which is included in one or more pictures different from the current picture and spatially matches or corresponds to the current block.

The selection unit 132 selects a merge vector from the list. Specifically, the selection unit 132 selects, as the merge vector, a motion vector which is used to code the motion vector of the current block.

The motion vector of the current block is referred to also as a current motion vector. The motion vector of the associated block, the motion vector of the neighboring block, and the motion vector of the co-located block are referred to also as an associated motion vector, a neighboring motion vector, and a co-located motion vector, respectively.

The coding unit 101 codes the current block using the merge vector selected by the selection unit 132. Specifically, the coding unit 101 merges, to the current block, the motion vector selected by the selection unit 132, and codes the current block using the merged motion vector.

By so doing, the image coding apparatus can select the merge vector from the list and use the merge vector to code the current block. Although the addition unit 131 and the selection unit 132 are included in the inter prediction control unit 121 in FIG. 8, the addition unit 131 and the selection unit 132 may be independent of the inter prediction control unit 121. In this case, the inter prediction control unit 121 does not have to be included in the image coding apparatus.

Figure 9:
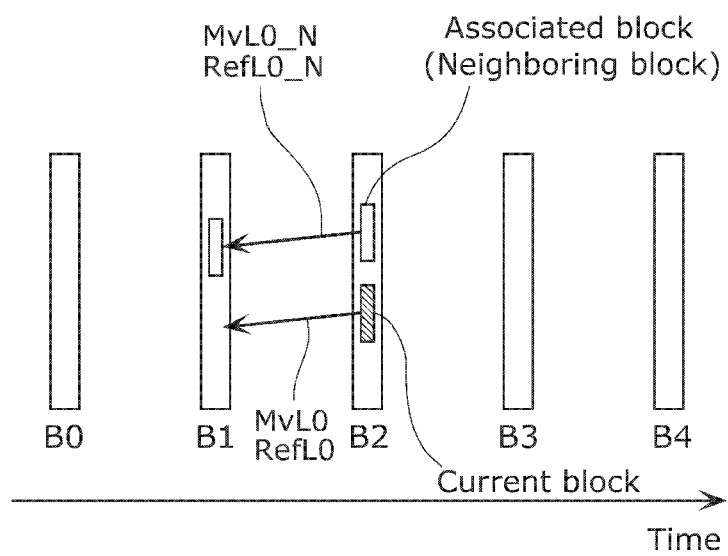
FIG. 9 shows a motion vector of a neighboring block according to Embodiment 1.

FIG. 9 shows a motion vector of a neighboring block according to this embodiment. In FIG. 9, a plurality of pictures B0 to B4 are shown in display order.

A motion vector MvL0 is a motion vector which is used to code the current block. A reference picture index RefL0 is a reference picture index which is indicated in the reference picture list L0 in coding of the current block.

A motion vector MvL0_N is a motion vector used to code a neighboring block. A reference picture index RefL0_N is a reference picture index indicated in the reference picture list L0 in coding of the neighboring block.

For example, the addition unit 131 adds the motion vector MvL0_N to the list. The selection unit 132 then selects the motion vector MvL0_N from the list. Subsequently, the coding unit 101 codes the current block using the selected motion vector MvL0_N.

Specifically, the coding unit 101 merges the motion vector MvL0_N of the neighboring block to the motion vector MvL0 of the current block, and codes the current block using the merged motion vector MvL0_N. The coding unit 101 may merge the reference picture index RefL0_N of the neighboring block to the reference picture index RefL0 of the current block.

Furthermore, the coding unit 101 codes the index which represents the selected motion vector MvL0_N. By so doing, the coding efficiency improves.

Figure 10:
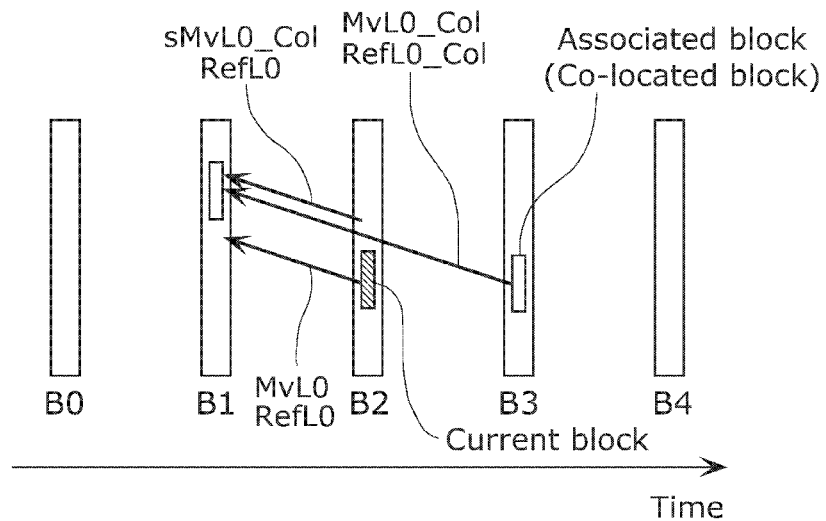
FIG. 10 shows a motion vector of a co-located block according to Embodiment 1.

FIG. 10 shows the motion vector of the co-located block according to this embodiment. In FIG. 10, a plurality of pictures B0 to B4 are shown in display order, as in FIG. 9.

The motion vector MvL0 is, as in the case of FIG. 9, a motion vector which is used to code the current block. The reference picture index RefL0 is, as in the case of FIG. 9, a reference picture index which is indicated in the reference picture list L0 in coding of the current block.

A motion vector MvL0_Col is a motion vector used to code the co-located block. A reference picture index RefL0_Col is a reference picture index indicated in the reference picture list L0 in coding of the co-located block.

A motion vector sMvL0_Col is a motion vector scaled at the ratio between the temporal distance from the current block to a reference picture thereof and the temporal distance from the co-located block to a reference picture thereof. The motion vector sMvL0_Col and the motion vector MvL0_Col are parallel to each other. For example, sMvL0_Col is derived from Expression 1.

$$sMvL0\_Col=MvL0\_Col*(POC(RefL0)-curPOC)/(POC(RefL0\_Col)-colPOC) \quad \text{(Expression 1)}$$

Here, curPOC represents the display order of the current picture, colPOC represents the display order of the picture including the co-located block, and POC(r) represents the display order of the reference picture identified by a reference picture index r. By so doing, the motion vector sMvL0_Col is obtained.

For example, the addition unit 131 obtains the motion vector sMvL0_Col by scaling the motion vector MvL0_Col. The addition unit 131 then adds the motion vector sMvL0_Col to the list. Subsequently, the selection unit 132 selects the motion vector sMvL0_Col from the list.

Subsequently, the coding unit 101 codes the current block using the selected motion vector sMvL0_Col.

Specifically, the coding unit 101 merges, to the motion vector MvL0 of the current block, the motion vector sMvL0_Col obtained by scaling the motion vector MvL0_Col of the co-located block. Subsequently, the coding unit 101 codes the current block using the merged motion vector sMvL0_Col.

Furthermore, the coding unit 101 codes the index which represents the selected motion vector sMvL0_Col. By so doing, the coding efficiency improves.

Figure 11:
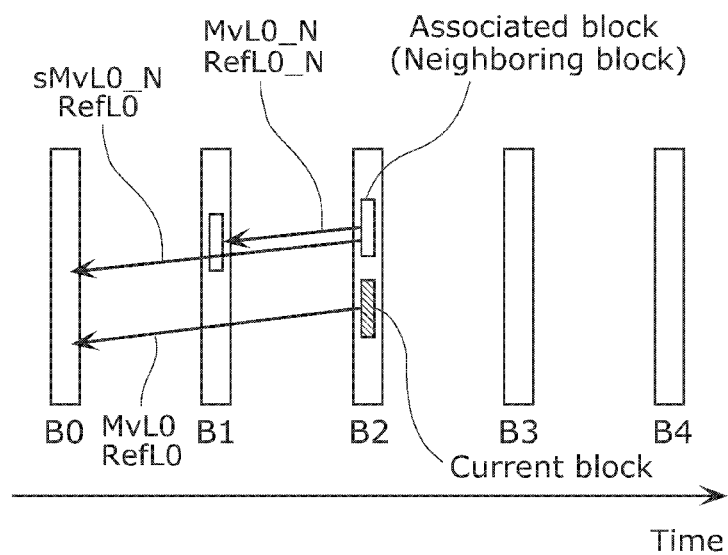
FIG. 11 shows a first example of a scaling process according to Embodiment 1.

FIG. 11 shows a first example of a scaling process according to this embodiment. The image coding apparatus according to this embodiment may, as in the case of the temporal direct mode, scale the motion vector of a neighboring block and use the scaled motion vector as the merge vector. FIG. 11 shows a scaling process on the motion vector of the neighboring block. In FIG. 11, a plurality of pictures B0 to B4 are shown in display order, as in FIG. 9.

The motion vector MvL0 is, as in the case of FIG. 9, a motion vector which is used to code the current block. The reference picture index RefL0 is, as in the case of FIG. 9, a reference picture index which is indicated in the reference picture list L0 in coding of the current block.

A motion vector MvL0_N is, as in the case of FIG. 9, a motion vector used to code the neighboring block. A reference picture index RefL0_N is, as in the case of FIG. 9, a reference picture index indicated in the reference picture list L0 in coding of the neighboring block.

A motion vector sMvL0_N is a motion vector scaled at the ratio between the temporal distance from the current block to a reference picture thereof and the temporal distance from the neighboring block to a reference picture thereof. The motion vector sMvL0_N and the motion vector MvL0_N are parallel to each other. For example, sMvL0_N is derived from Expression 2.

$$sMvL0\_N=MvL0\_N*(POC(RefL0)-curPOC)/(POC(RefL0\_N)-curPOC) \quad \text{(Expression 2)}$$

Here, curPOC represents the display order of the current picture, and POC(r) represents the display order of the reference picture identified by the reference picture index r. By so doing, the motion vector sMvL0_N is obtained.

For example, the addition unit 131 obtains the motion vector sMvL0_N by scaling the motion vector MvL0_N. The addition unit 131 then adds the motion vector sMvL0_N to the list. Subsequently, the selection unit 132 selects the motion vector sMvL0_N from the list.

Subsequently, the coding unit 101 codes the current block using the selected motion vector MvL0_N.

Specifically, the coding unit 101 merges, to the motion vector MvL0 of the current block, the motion vector sMvL0_N obtained by scaling the motion vector MvL0_N of the neighboring block. Subsequently, the coding unit 101 codes the current block using the merged motion vector sMvL0_N.

Furthermore, the coding unit 101 codes the index which represents the selected motion vector sMvL0_N. By so doing, the coding efficiency improves.

Figure 12:
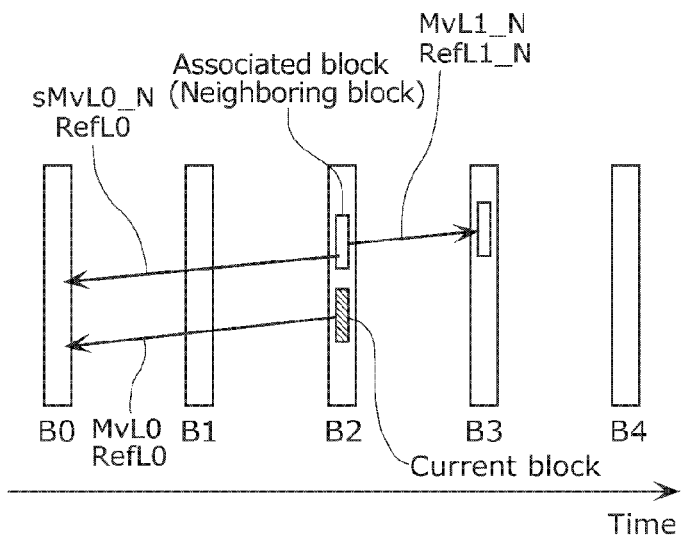
FIG. 12 shows a second example of the scaling process according to Embodiment 1.

FIG. 12 shows a second example of the scaling process according to this embodiment. FIGS. 9, 10, and 11 show the examples where the reference picture list L0 is used. However, even when the reference picture list L1 is used, the image coding apparatus according to this embodiment can likewise use the motion vector of the associated block as the merge vector.

Furthermore, the image coding apparatus according to this embodiment may use, as the merge vector in the inter prediction using the reference picture list L0, a motion vector in the inter prediction using the reference picture list L1. For example, the image coding apparatus may use a motion vector in backward prediction as a merge vector in forward prediction. FIG. 12 shows an example of such a case. In FIG. 12, a plurality of pictures B0 to B4 are shown in display order, as in FIG. 9.

The motion vector MvL0 is, as in the case of FIG. 9, a motion vector which is used to code the current block. The reference picture index RefL0 is, as in the case of FIG. 9, a reference picture index which is indicated in the reference picture list L0 in coding of the current block.

A motion vector MvL1_N is a motion vector used to code a neighboring block. A reference picture index RefL1_N is a reference picture index indicated in the reference picture list L1 in coding of the neighboring block.

A motion vector sMvL0_N is a motion vector scaled at the ratio between the temporal distance from the current block to a reference picture thereof and the temporal distance from the neighboring block to a reference picture thereof. The motion vector sMvL0_N and the motion vector MvL1_N are parallel to each other. For example, sMvL0_N is derived from Expression 3.

$$sMvL0\_N=MvL1\_N*(POC(RefL0)-curPOC)/(POC(RefL1\_N)-curPOC) \quad \text{(Expression 3)}$$

Here, curPOC represents the display order of the current picture, and POC(r) represents the display order of the reference picture identified by the reference picture index r. By so doing, the motion vector sMvL0_N is obtained.

Thus, even when the prediction direction is opposite, the image coding apparatus can scale the motion vector and use the scaled motion vector as the merge vector.

Figure 13:
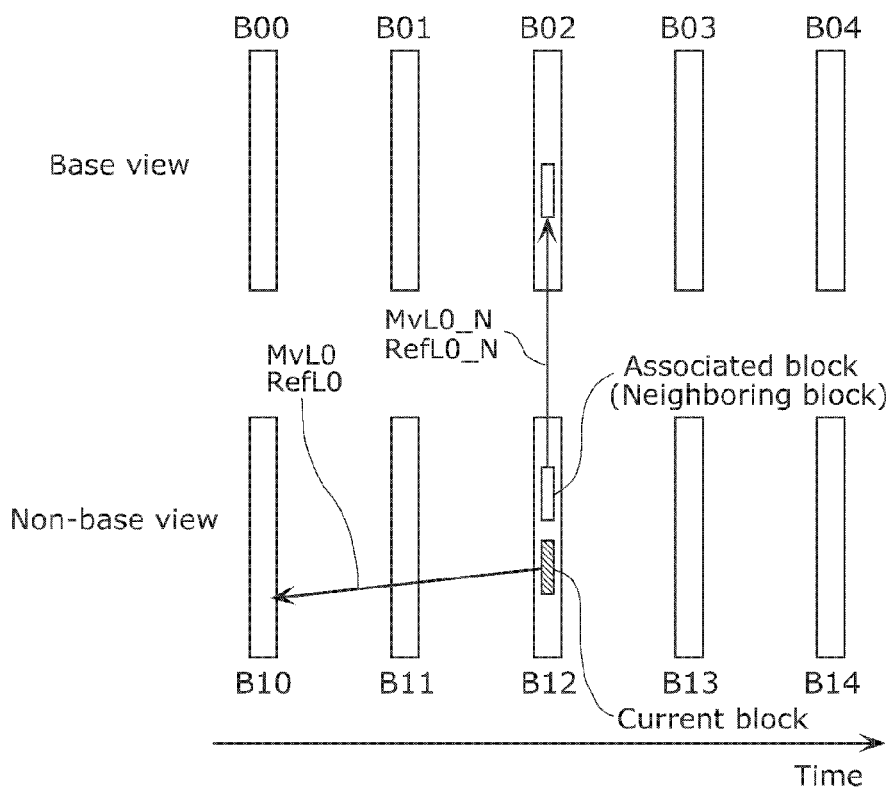
FIG. 13 shows a first example of a reference relationship according to Embodiment 1.

FIG. 13 shows a first example of a reference relationship according to this embodiment. FIG. 13 shows two views: a base view and a non-base view. Each of the two views includes a plurality of pictures. For example, the two views are two videos captured from different viewpoints. The image coding apparatus according to this embodiment may have a function of the multiview video coding (MVC) in which multiview video is coded.

The image coding apparatus having the MVC function is capable of coding a picture in the non-base view with reference to a picture in the base view. When the image coding apparatus codes the picture in the non-base view with reference to the picture in the base view, the display order of the picture to be referred to and the display order of the picture to be coded match.

In FIG. 13, a plurality of pictures B00 to B04 in the base view and a plurality of pictures B10 to B14 in the non-base view are shown in display order.

A motion vector MvL0 is a motion vector which is used to code the current block. A reference picture index RefL0 is a reference picture index which is indicated in the reference picture list L0 in coding of the current block.

A motion vector MvL0_N is a motion vector used to code a neighboring block. A reference picture index RefL0_N is a reference picture index indicated in the reference picture list L0 in coding of the neighboring block.

In the example of FIG. 13, the temporal distance from the current block to a reference picture thereof is different from the temporal distance from the neighboring block to a reference picture thereof. The motion vector MvL0_N therefore needs to be scaled according to Expression 2. However, in the example of FIG. 13, the temporal distance from the neighboring block to a reference picture thereof is 0. Accordingly, the denominator in Expression 2 becomes 0, with the result that the addition unit 131 cannot scale the motion vector MvL0_N.

Thus, in such a case, the addition unit 131 does not add the motion vector of such neighboring block to the list. By so doing, the addition unit 131 does not have to calculate a merge vector from such neighboring block. Furthermore, this results in that the motion vector of such neighboring block is not selected by the selection unit 132. Thus, the image coding apparatus according to this embodiment can continue its operation without problems.

Figure 14:
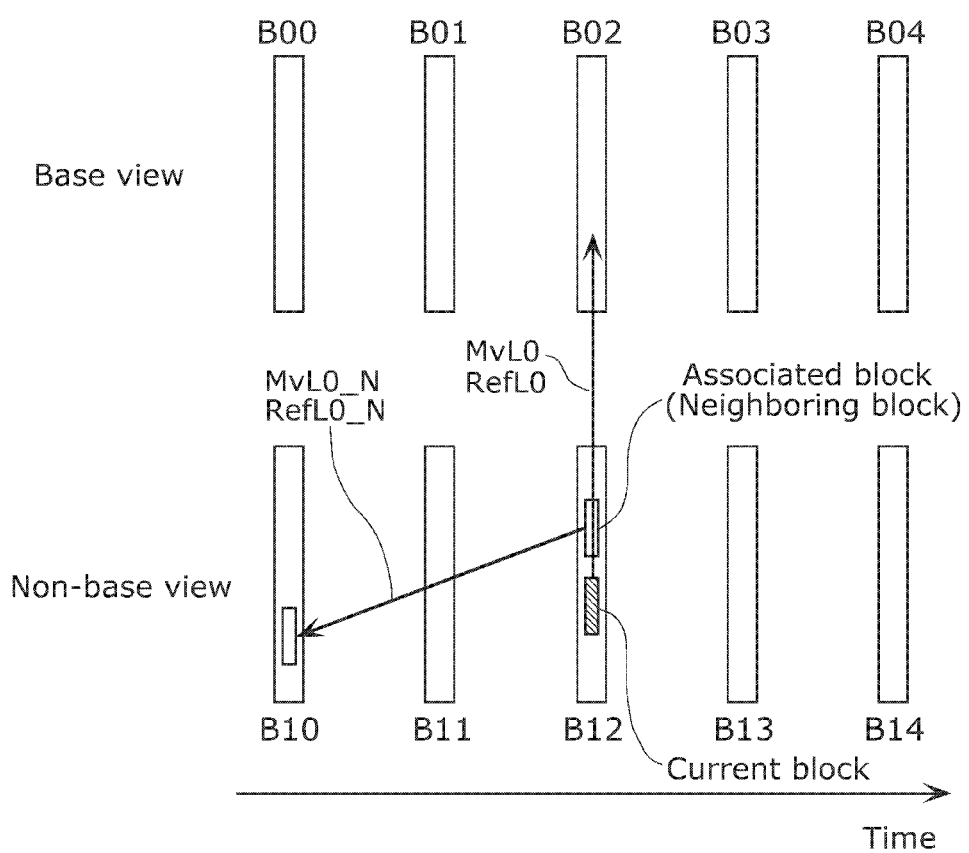
FIG. 14 shows a second example of the reference relationship according to Embodiment 1.

FIG. 14 shows a second example of the reference relationship according to this embodiment. FIG. 14 shows the two views: the base view and the non-base view, as in FIG. 13. Furthermore, the plurality of pictures B00 to B04 in the base view and the plurality of pictures B10 to B14 in the non-base view are shown in display order.

The motion vector MvL0 is, as in the case of FIG. 13, a motion vector which is used to code the current block. The reference picture index RefL0 is, as in the case of FIG. 13, a reference picture index which is indicated in the reference picture list L0 in coding of the current block.

A motion vector MvL0_N is, as in the case of FIG. 13, a motion vector used to code the neighboring block. A reference picture index RefL0_N is, as in the case of FIG. 13, a reference picture index indicated in the reference picture list L0 in coding of the neighboring block.

In the example of FIG. 14, the temporal distance from the current block to a reference picture thereof is different from the temporal distance from the neighboring block to a reference picture thereof. The motion vector MvL0_N therefore needs to be scaled according to Expression 2. However, in the example of FIG. 14, the temporal distance from the current block to a reference picture thereof is 0. Accordingly, the numerator in Expression 2 becomes 0, with the result that the addition unit 131 cannot appropriately scale the motion vector MvL0_N.

Thus, in such a case, the addition unit 131 does not add the motion vector of such neighboring block to the list. By so doing, the addition unit 131 does not have to calculate a merge vector from such neighboring block. Furthermore, this results in that the motion vector of such neighboring block is not selected by the selection unit 132. Thus, the image coding apparatus according to this embodiment can continue its operation without problems.

Figure 15:
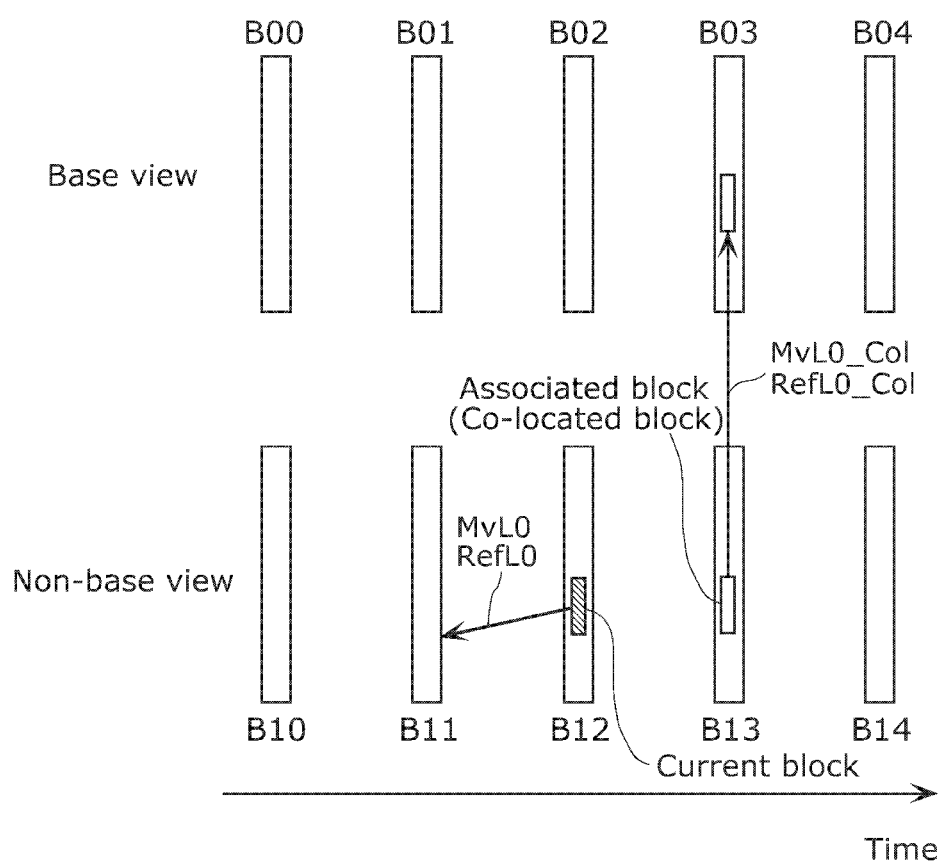
FIG. 15 shows a third example of the reference relationship according to Embodiment 1.

FIG. 15 shows a third example of the reference relationship according to this embodiment. FIG. 15 shows the two views: the base view and the non-base view, as in FIG. 13. Furthermore, the plurality of pictures B00 to B04 in the base view and the plurality of pictures B10 to B14 in the non-base view are shown in display order.

The motion vector MvL0 is, as in the case of FIG. 13, a motion vector which is used to code the current block. The reference picture index RefL0 is, as in the case of FIG. 13, a reference picture index which is indicated in the reference picture list L0 in coding of the current block.

A motion vector MvL0_Col is a motion vector used to code the co-located block. A reference picture index RefL0_Col is a reference picture index indicated in the reference picture list L0 in coding of the neighboring block.

In the example of FIG. 15, the temporal distance from the current block to a reference picture thereof is different from the temporal distance from the co-located block to a reference picture thereof. Thus, the motion vector MvL0_Col therefore needs to be scaled according to Expression 1. However, in the example of FIG. 15, the temporal distance from the co-located block to a reference picture thereof is 0. Accordingly, the denominator in Expression 1 becomes 0, with the result that the addition unit 131 cannot scale the motion vector MvL0_Col.

Thus, in such a case, the addition unit 131 does not add the motion vector of such co-located block to the list. By so doing, the addition unit 131 does not have to calculate a merge vector from such co-located block. Furthermore, this results in that the motion vector of such co-located block is not selected by the selection unit 132. Thus, the image coding apparatus according to this embodiment can continue its operation without problems.

Figure 16:
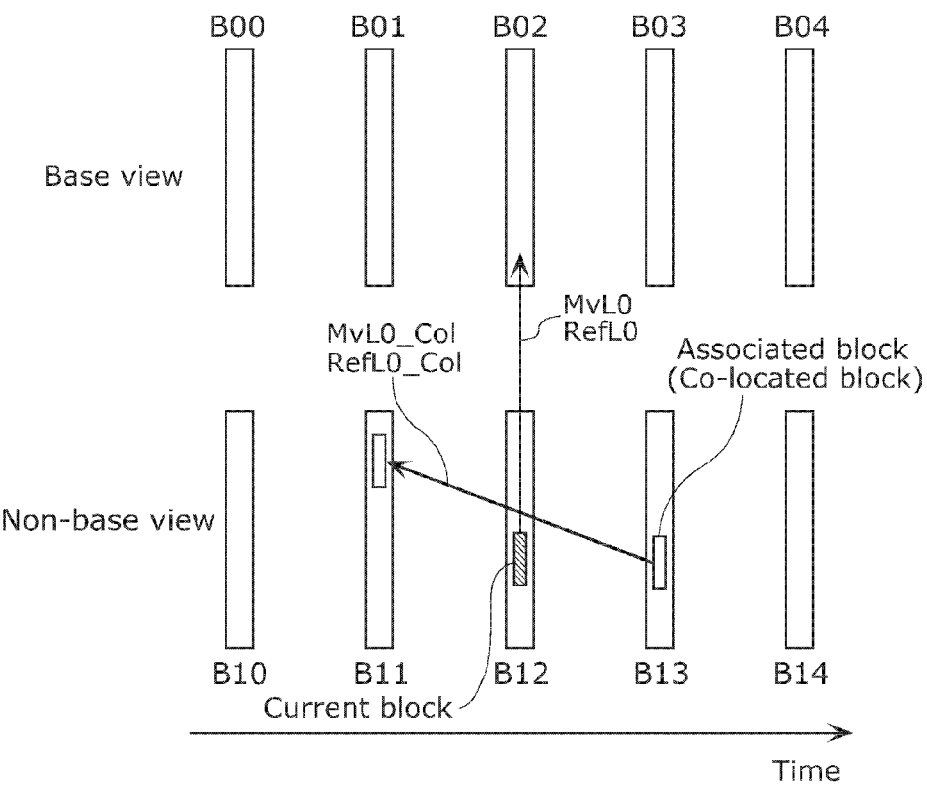
FIG. 16 shows a fourth example of the reference relationship according to Embodiment 1.

FIG. 16 shows a fourth example of the reference relationship according to this embodiment. FIG. 16 shows the two views: the base view and the non-base view, as in FIG. 15. Furthermore, the plurality of pictures B00 to B04 in the base view and the plurality of pictures B10 to B14 in the non-base view are shown in display order.

The motion vector MvL0 is, as in the case of FIG. 15, a motion vector which is used to code the current block. The reference picture index RefL0 is, as in the case of FIG. 15, a reference picture index which is indicated in the reference picture list L0 in coding of the current block.

A motion vector MvL0_Col is, as in the case of FIG. 15, a motion vector used to code the co-located block. A reference picture index RefL0_Col is, as in the case of FIG. 15, a reference picture index indicated in the reference picture list L0 in coding of the co-located block.

In the example of FIG. 16, the temporal distance from the current block to a reference picture thereof is different from the temporal distance from the co-located block to a reference picture thereof. Thus, the motion vector MvL0_Col therefore needs to be scaled according to Expression 1. However, in the example of FIG. 16, the temporal distance from the current block to a reference picture thereof is 0. Accordingly, the numerator in Expression 1 becomes 0, with the result that the addition unit 131 cannot appropriately scale the motion vector MvL0_Col.

Thus, in such a case, the addition unit 131 does not add the motion vector of such co-located block to the list. By so doing, the addition unit 131 does not have to calculate a merge vector from such co-located block. Furthermore, this results in that the motion vector of such co-located block is not selected by the selection unit 132. Thus, the image coding apparatus according to this embodiment can continue its operation without problems.

It is to be noted that FIGS. 13 to 16 show the cases where the reference picture list L0 is used. However, the same applies to the case where the reference picture list L1 is used. Furthermore, the same applies also to the case where the motion vector in the inter prediction using the reference picture list L1 is used as the merge vector in the inter prediction using the reference picture list L0. In addition, although the plurality of views are shown in the examples of FIGS. 13 to 16, the image coding apparatus may apply the same or like processing not only in the case of MVC, but also in a single view.

Figure 17:
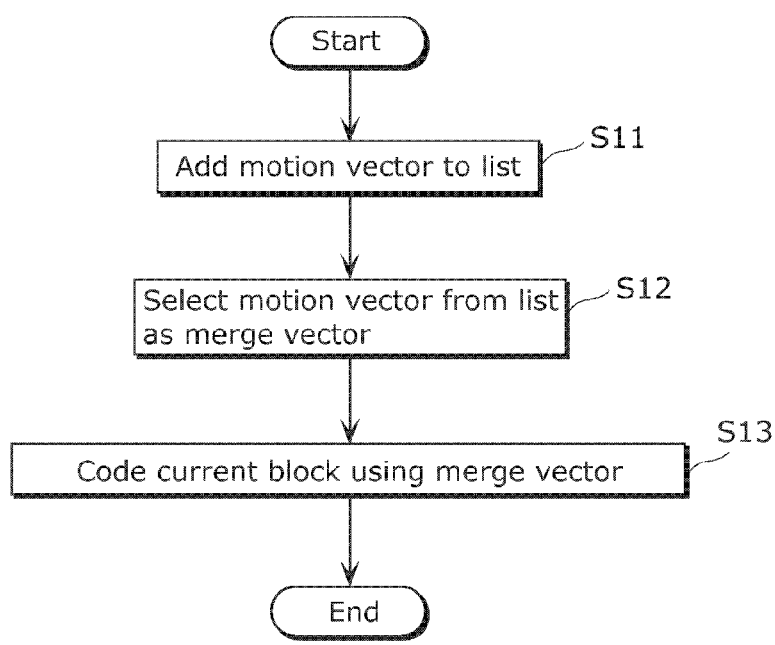
FIG. 17 is a flowchart showing an operation of the image coding apparatus according to Embodiment 1.

FIG. 17 is a flowchart showing an operation of the image coding apparatus shown in FIG. 8. First, the addition unit 131 selectively adds a motion vector of each of one or more associated blocks to a list (S11). Each of the one or more associated blocks is a block which is included in the current picture and spatially adjacent to the current block, or a block which is included in a picture different from the current picture and spatially matches or corresponds to the current block.

(i) For each of the one or more associated blocks, when the associated block has been coded by referring to, using the motion vector of the associated block, a picture which temporally matches the associated block, the addition unit 131 does not add the motion vector of the associated block to the list. (ii) For each of the one or more associated blocks, when the current block is coded using the motion vector of the current block with reference to a picture which temporally matches the current block, the addition unit 131 does not add the motion vector of the associated block to the list. It may be possible that the addition unit 131 apply only one of the two limitations (i) and (ii).

Next, from the list, the selection unit 132 selects, as the merge vector, a motion vector which is used to code the motion vector of the current block (S12). The coding unit 101 then codes the current block using the merge vector (S13). Specifically, the coding unit 101 merges the merge vector to the current block and codes the current block using the merge vector. By so doing, the current block is coded.

Figure 18:
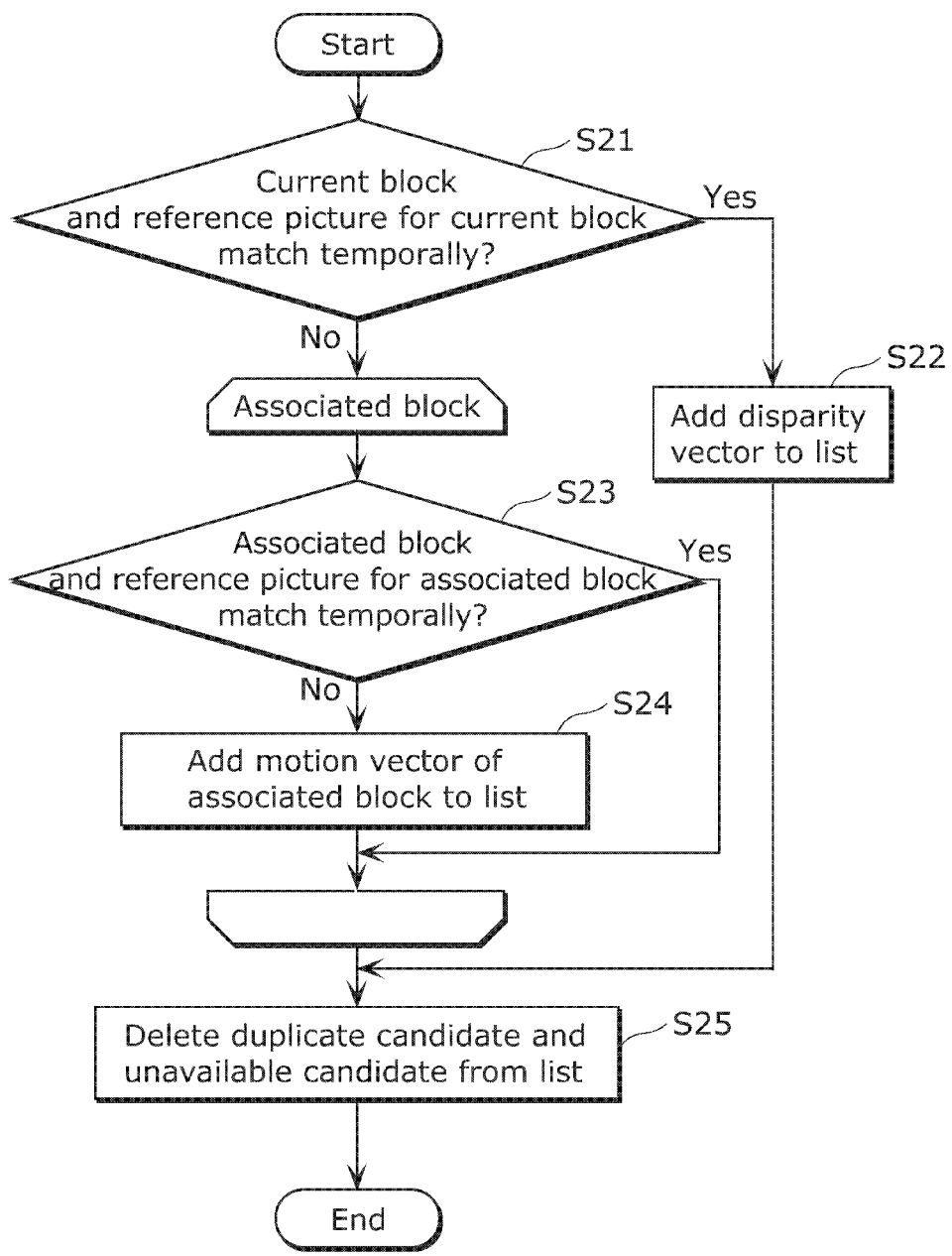
FIG. 18 is a flowchart showing a detailed operation of the image coding apparatus according to Embodiment 1.

FIG. 18 is a flowchart showing details of the operation shown in FIG. 17. In FIG. 18, the addition process (S11) shown in FIG. 17 is specifically shown.

First, the addition unit 131 determines whether or not the current block and a reference block thereof match temporally (S21). Subsequently, when the current block and a reference block thereof match temporally (Yes in S21), the addition unit 131 adds a disparity vector to the list (S22). The disparity vector is a motion vector which represents a magnitude and a direction of disparity. For example, the disparity vector represents a difference in image location between a picture in the base view and a picture in the non-base view.

The addition unit 131 may add, to the list, the disparity vector which has been used in the past. Specifically, the addition unit 131 may add, to the list, the motion vector which was used in the past when the base view was referred to. In addition, according to statistics such as the average of the disparity vectors which have been used in the past, the addition unit 131 may calculate a disparity vector which is to be added to the list.

On the other hand, when the current block and a reference block thereof do not match temporally (No in S21), the addition unit 131 determines, for each of the one or more associated blocks, whether or not the associated block and a reference picture thereof match temporally (S23). When the associated block and a reference picture thereof do not match temporally (No in S23), the addition unit 131 adds the motion vector of the associated block to the list (S24). At this time, the addition unit 131 may scale the motion vector of the associated block and add the scaled motion vector to the list.

Next, the addition unit 131 deletes, from the list, a duplicate candidate and an unavailable candidate (S25). By so doing, an appropriate list is created.

In addition, the coding unit 101 may attach a disparity vector to a header. For example, to the header of an entire coded stream, the coding unit 101 may attach a disparity vector as a sequence parameter set (SPS).

Alternatively, to the header of a picture included in a coded stream, the coding unit 101 may attach a disparity vector as a picture parameter set (PPS). To the header of a slice included in a coded stream, the coding unit 101 may attach a disparity vector as a slice header.

Furthermore, what the addition unit 131 adds to the list is not limited to the disparity vector and may be a predetermined vector. To the header of a coded stream, the coding unit 101 may then attach the predetermined vector as a sequence parameter set, a picture parameter set, or a slice header. The magnitude of the predetermined vector which is added to the list may be 0.

Figure 19:
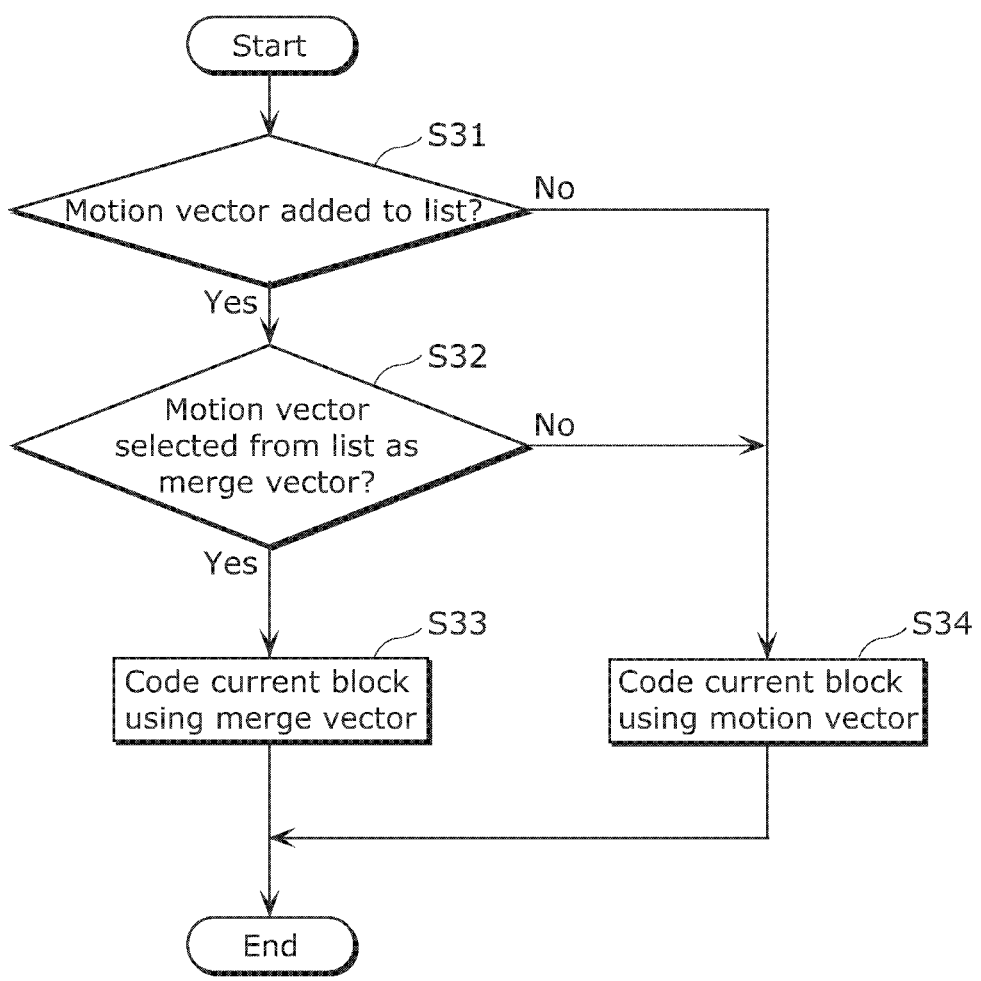
FIG. 19 is a flowchart showing a variation of the operation of the image coding apparatus according to Embodiment 1.

FIG. 19 is a flowchart showing a variation of the operation shown in FIG. 17. First, the addition unit 131 selectively adds a motion vector of each of one or more associated blocks to a list (S31).

Here, when at least one motion vector is added to the list (Yes in S31), the selection unit 132 determines whether or not to select a merge vector from the list (S32). At this time, the selection unit 132 may select or not select a merge vector. For example, when the list contains no motion vector which is close to the motion vector of the current block, the selection unit 132 does not have to select a merge vector from the list.

When a merge vector is selected (Yes in S32), the coding unit 101 codes the current block using the selected merge vector (S33).

When no motion vector is added to the list (No in S31) or when no merge vector is selected (No in S32), the coding unit 101 codes the current block using the motion vector resulting from motion estimation or the like (S34). By so doing, even when no motion vector is added to the list (No in S31) or when no merge vector is selected (No in S32), the image coding apparatus can continue its operation without problems.

It is to be noted that when no motion vector is added to the list (No in S31) or when no merge vector is selected (No in S32), the merge vector may be deemed to be a predetermined motion vector.

As above, the image coding apparatus is capable of appropriately selecting a merge vector from the list even when there is a possibility that a block is coded with reference to a picture which temporally matches the block. Although the foregoing describes the image coding apparatus, an image decoding apparatus can also appropriately select a merge vector from the list in the same or like procedure.

Figure 20:
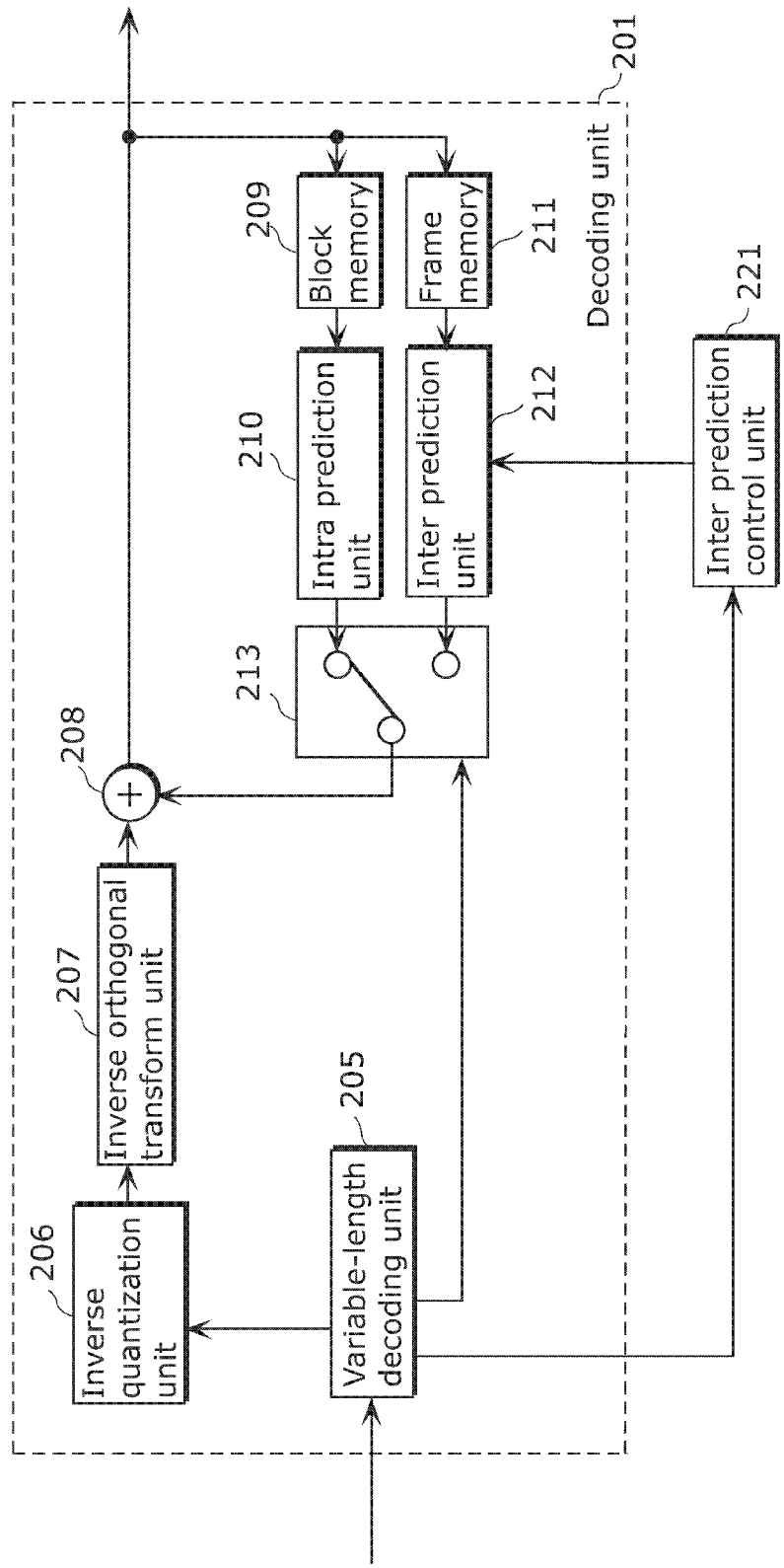
FIG. 20 shows a configuration of an image decoding apparatus according to Embodiment 1.

FIG. 20 is a structural diagram showing an image decoding apparatus according to this embodiment. The image decoding apparatus shown in FIG. 20 includes the decoding unit 201 and the inter prediction control unit 221. The decoding unit 201 includes a variable-length decoding unit 205, an inverse quantization unit 206, an inverse orthogonal transform unit 207, an addition unit 208, a block memory 209, an intra prediction unit 210, a frame memory 211, an inter prediction unit 212, and a switch 213.

The variable-length decoding unit 205 performs a variable-length decoding process on a received bitstream to decode the picture type information, the merge vector index, the prediction error data, and the like. The inverse quantization unit 206 performs an inverse quantization process on the prediction error data. The inverse orthogonal transform unit 207 transforms, from the frequency domain into the image domain, the prediction error data on which the inverse quantization process has been performed. The addition unit 208 adds the prediction image data and the prediction error data to generate decoded image data.

The block memory 209 is a memory for storing the decoded image data on a per block basis. The frame memory 211 is a memory for storing the decoded image data on a per frame basis.

The intra prediction unit 210 performs intra prediction using the per-block decoded image data stored in the block memory 209, to generate prediction image data of a current block to be decoded. The inter prediction unit 212 performs inter prediction using the per-frame decoded image data stored in the frame memory 211, to generate prediction image data of the current block. The switch 213 switches a coding mode to the intra prediction or the inter prediction.

The inter prediction control unit 221 selects a merge vector from the list. Processing which is performed by the inter prediction control unit 221 is the same or alike as the processing which is performed by the inter prediction control unit 121 in the image coding apparatus. In other words, the inter prediction control unit 221 is achieved by changing the coding part of the above-described coding processing into decoding. It is to be noted that, in selecting a merge vector from the list, the inter prediction control unit 221 uses an index decoded by the variable-length decoding unit 205.

Although FIG. 20 shows an example of the configuration of the image decoding apparatus according to this embodiment, a specific structural embodiment is not limited to the configuration shown in FIG. 20. For example, the decoding unit 201 does not need to include a plurality of structural elements. In addition, the decoding unit 201 may decode an image without performing the inverse frequency transform, the inverse quantization, the intra prediction, and the like.

Figure 21:
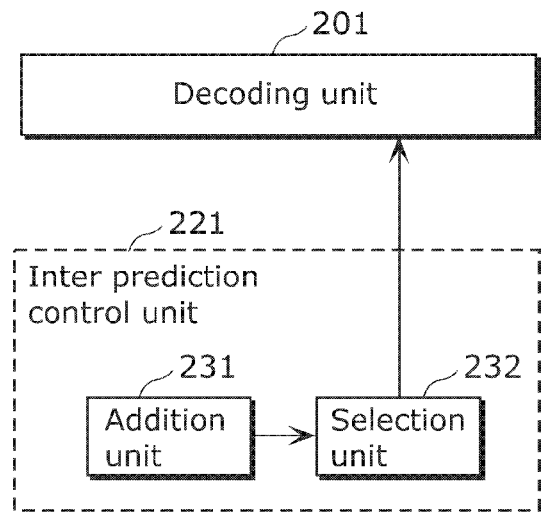
FIG. 21 shows a configuration of main structural elements of the image decoding apparatus according to Embodiment 1.

FIG. 21 shows a configuration of main structural elements of the image decoding apparatus shown in FIG. 20. The image decoding apparatus shown in FIG. 21 includes the decoding unit 201 and the inter prediction control unit 221. The inter prediction control unit 221 includes an addition unit 231 and a selection unit 232.

The addition unit 231 selectively adds a motion vector of each of one or more associated blocks to a list. Specifically, the adding unit 231 selects, for each of the one or more associated blocks, whether or not to add the motion vector of the associated block to the list, and adds, to the list, the motion vector selected as a motion vector to be added. The addition unit 231 may add all the one or more motion vectors of the one or more associated blocks to the list and may alternatively add part of the one or more motion vectors of the one or more associated blocks to the list.

The associated block is a decoded neighboring block, a decoded co-located block, or the like. Specifically, the associated bock may be a block which is included in the current picture and spatially adjacent to the current block. Alternatively, the associated block may be a block which is included in one or more pictures different from the current picture and spatially matches or corresponds to the current block.

The selection unit 232 selects a merge vector from the list. Specifically, the selection unit 232 selects, as the merge vector, a motion vector which is used to decode the current block. The motion vector of the current block is referred to also as a current motion vector.

The decoding unit 201 decodes the current block using the merge vector selected by the selection unit 232. Specifically, the decoding unit 201 merges, to the current block, the motion vector selected by the selecting unit 232, and decodes the current block using the merged motion vector.

By so doing, the image decoding apparatus can select the merge vector from the list and use the merge vector to decode the current block. Although the addition unit 231 and the selection unit 232 are included in the inter prediction control unit 221 in FIG. 21, the addition unit 231 and the selection unit 232 may be independent of the inter prediction control unit 221. In this case, the inter prediction control unit 221 does not have to be included in the image decoding apparatus.

Figure 22:
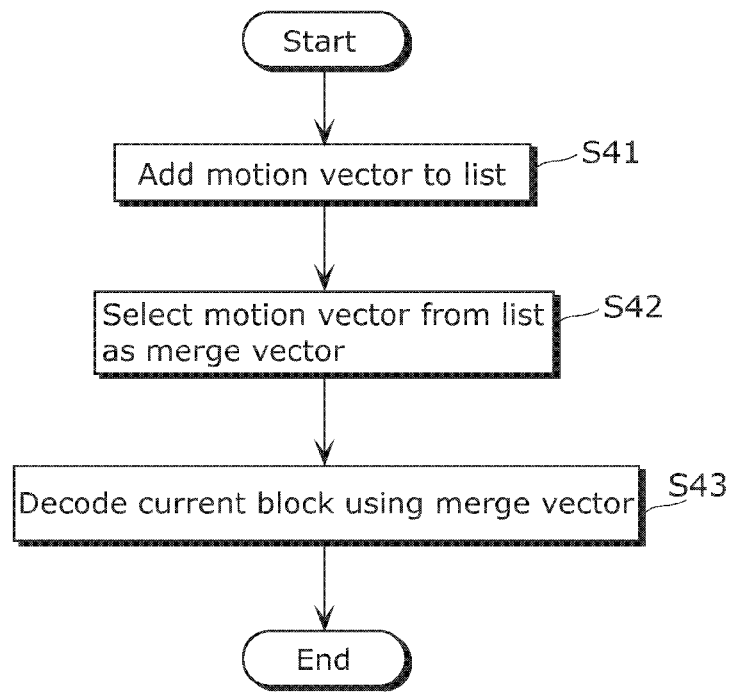
FIG. 22 is a flowchart showing an operation of the image decoding apparatus according to Embodiment 1.

FIG. 22 is a flowchart showing an operation of the image decoding apparatus shown in FIG. 21. First, the addition unit 231 selectively adds a motion vector of each of one or more associated blocks to a list (S41). Each of the one or more associated blocks is a block which is included in the current picture and spatially adjacent to the current block, or a block which is included in a picture different from the current picture and spatially matches or corresponds to the current block.

(i) For each of the one or more associated blocks, when the associated block has been decoded by referring to, using the motion vector of the associated block, a picture which temporally matches the associated block, the addition unit 231 does not add the motion vector of the associated block to the list. (ii) For each of the one or more associated blocks, when the current block is decoded using the motion vector of the current block with reference to a picture which temporally matches the current block, the addition unit 231 does not add the motion vector of the associated block to the list. It may be possible that the addition unit 231 apply only one of the two limitations (i) and (ii).

Next, from the list, the selection unit 232 selects, as the merge vector, a motion vector which is used to decode the current block (S42).

Next, the decoding unit 201 decodes the current block using the merge vector selected by the selection unit 232 (S43). Specifically, the decoding unit 201 merges the merge vector to the current block and decodes the current block using the merge vector. By so doing, the current block is decoded.

Figure 23:
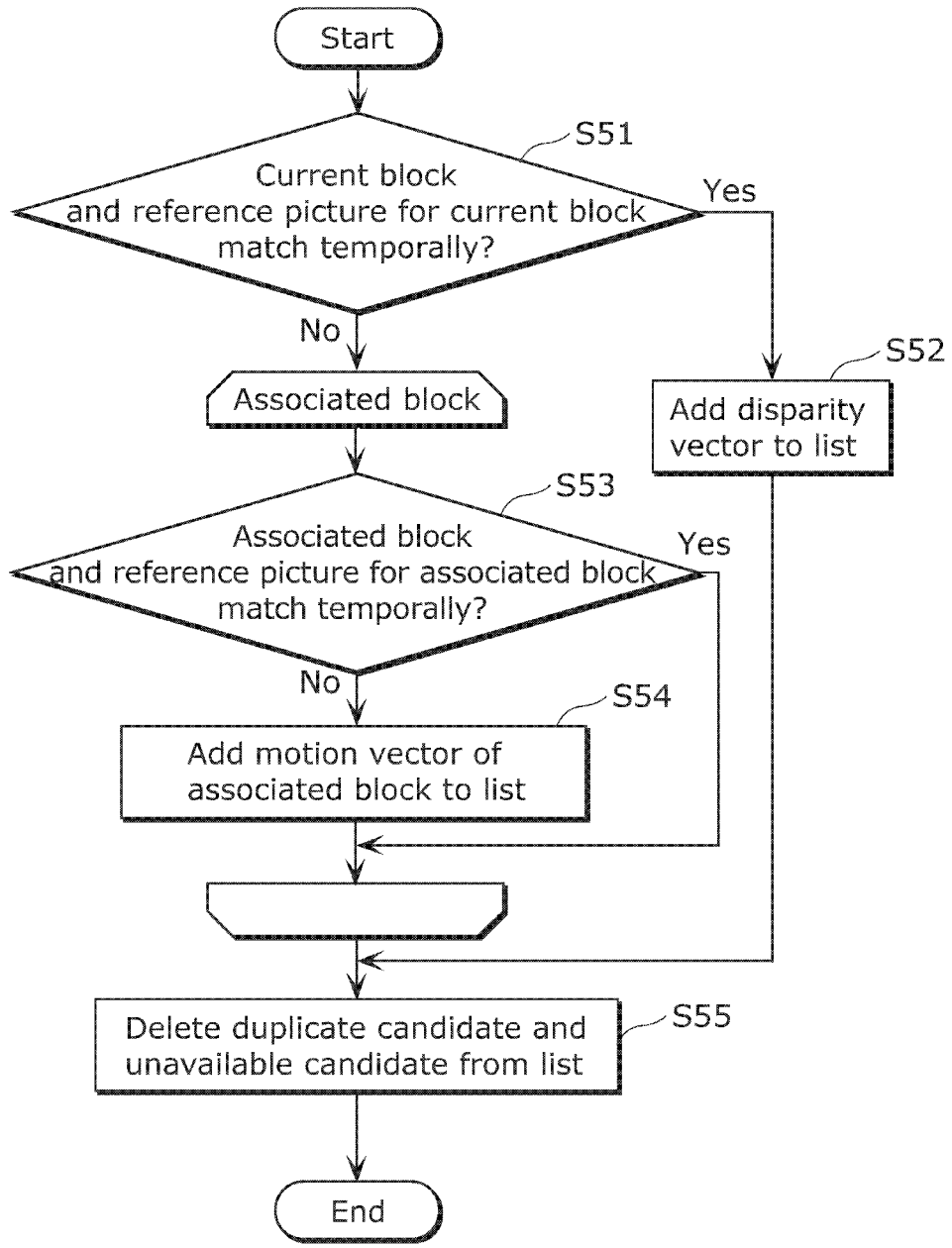
FIG. 23 is a flowchart showing a detailed operation of the image decoding apparatus according to Embodiment 1.

FIG. 23 is a flowchart showing details of the operation shown in FIG. 22. In FIG. 23, the addition process (S41) shown in FIG. 22 is specifically shown.

First, the addition unit 231 determines whether or not the current block and a reference block thereof match temporally (S51). Subsequently, when the current block and a reference block thereof match temporally (Yes in S51), the addition unit 231 adds a disparity vector to the list (S52).

The addition unit 231 may add, to the list, the disparity vector which has been used in the past. Specifically, the addition unit 231 may add, to the list, the motion vector which was used in the past when the base view was referred to. In addition, according to statistics such as the average of the disparity vectors which have been used in the past, the addition unit 231 may calculate a disparity vector which is to be added to the list.

On the other hand, when the current block and a reference block thereof do not match temporally (No in S51), the addition unit 231 determines, for each of the one or more associated blocks, whether or not the associated block and a reference picture thereof match temporally (S53). When the associated block and a reference picture thereof do not match temporally (No in S53), the addition unit 231 adds the motion vector of the associated block to the list (S54). At this time, the addition unit 231 may scale the motion vector of the associated block and add the scaled motion vector to the list.

Next, the addition unit 231 deletes, from the list, a duplicate candidate and an unavailable candidate (S55). By so doing, an appropriate list is created.

In addition, the decoding unit 201 may obtain a disparity vector which has been attached to a header included in the coded stream. For example, the decoding unit 201 may obtain a disparity vector from the sequence parameter set that is the header of the entire coded stream. Alternatively, the decoding unit 201 may obtain a disparity vector from the picture parameter set that is the header of a picture included in the coded stream. The decoding unit 201 may obtain a disparity vector from the slice header that is the header of a slice included in the coded stream.

Furthermore, what the addition unit 231 adds to the list is not limited to the disparity vector and may be a predetermined vector. From the header (such as the sequence parameter set, the picture parameter set, or the slice header) of the coded stream, the decoding unit 201 may then obtain the predetermined vector.

Figure 24:
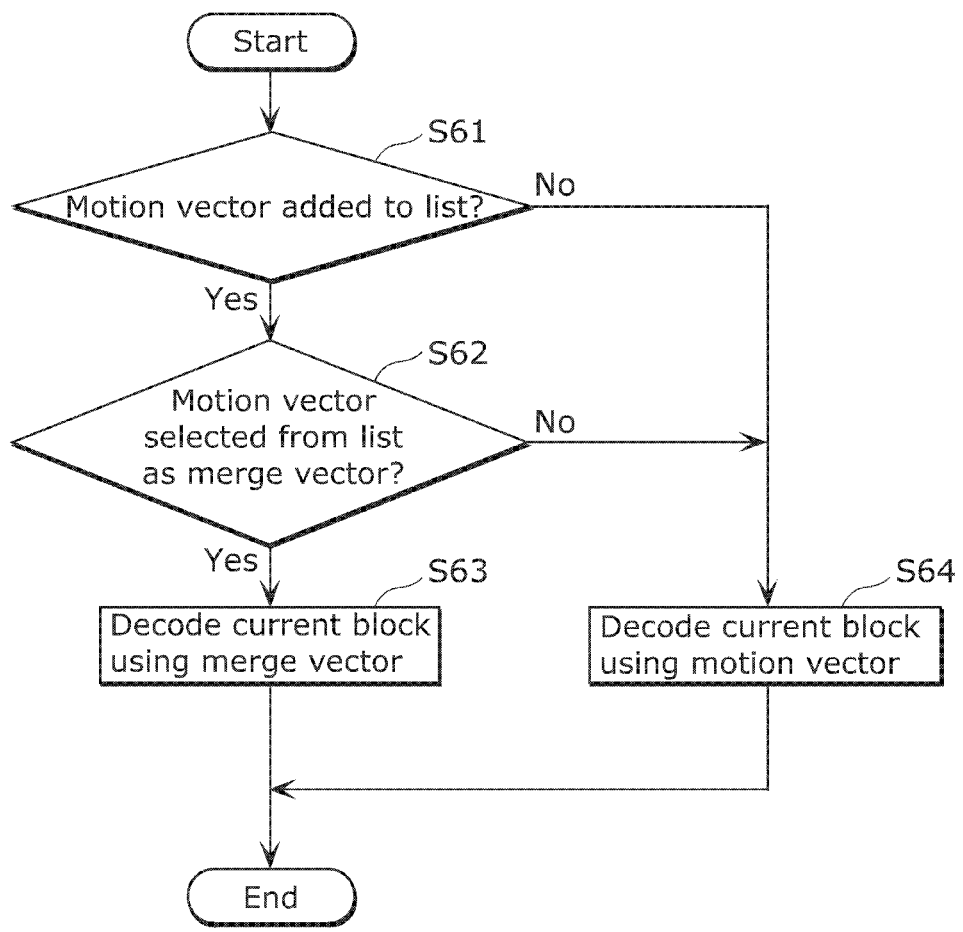
FIG. 24 is a flowchart showing a variation of the operation of the image decoding apparatus according to Embodiment 1.

FIG. 24 is a flowchart showing a variation of the operation shown in FIG. 22. First, the addition unit 231 selectively adds a motion vector of each of one or more associated blocks to a list (S61).

Here, when at least one motion vector is added to the list (Yes in S61), the selection unit 232 determines whether or not to select a merge vector from the list (S62). For example, when the index representing the merge vector has not been coded, that is, when the coded stream contains no index, the selection unit 232 does not select merge vectors from the list.

When a merge vector is selected (Yes in S62), the decoding unit 201 decodes the current block using the merge vector selected by the selection unit 232 (S63).

When no motion vector is added to the list (No in S61) or when no merge vector is selected (No in S62), the decoding unit 201 decodes the motion vector of the current block. Subsequently, the decoding unit 201 decodes the current block using the decoded motion vector (S64). By so doing, even when no motion vector is added to the list (No in S61) or when no merge vector is selected (No in S62), the image decoding apparatus can continue its operation without problems.

It is to be noted that when no motion vector is added to the list (No in S61) or when no merge vector is selected (No in S62), the merge vector may be deemed to be a predetermined motion vector.

As above, the image decoding apparatus is capable of appropriately selecting a merge vector from the list even when a block is decoded with reference to a picture which temporally matches the block.

In the above description, the motion vector of each of the associated blocks is added to the list. However, the mean, the median, and the like of the motion vectors of the associated blocks may be added to the list. In this case, the addition unit 131 of the image coding apparatus and the addition unit 231 of the image decoding apparatus calculate the mean, the median, and the like, and add them to the list. Alternatively, the two addition units 131 and 231 may calculate the mean, the median, and the like of the motion vectors from the plurality of associated blocks excluding the associated blocks which temporally match reference pictures thereof.

Furthermore, in the above description, when the block to be processed (the current block to be coded or decoded) and the reference picture of the block to be processed match temporally, adding the motion vector of the associated block to the list is limited. Alternatively, when the associated block and the reference picture of the associated block match temporally, adding the motion vector of the associated block to the list is limited.

However, when the block to be processed and the reference picture of the block to be processed match temporally and when the associated block and the reference picture of the associated block match temporally, there is no need to scale the motion vector of the associated block. Accordingly, in such a case, the addition unit 131 of the image coding apparatus and the addition unit 231 of the image decoding apparatus may add the motion vector of the associated block to the list without performing any processing on the motion vector. The following shall specifically describe an example of such a case.

Figure 25:
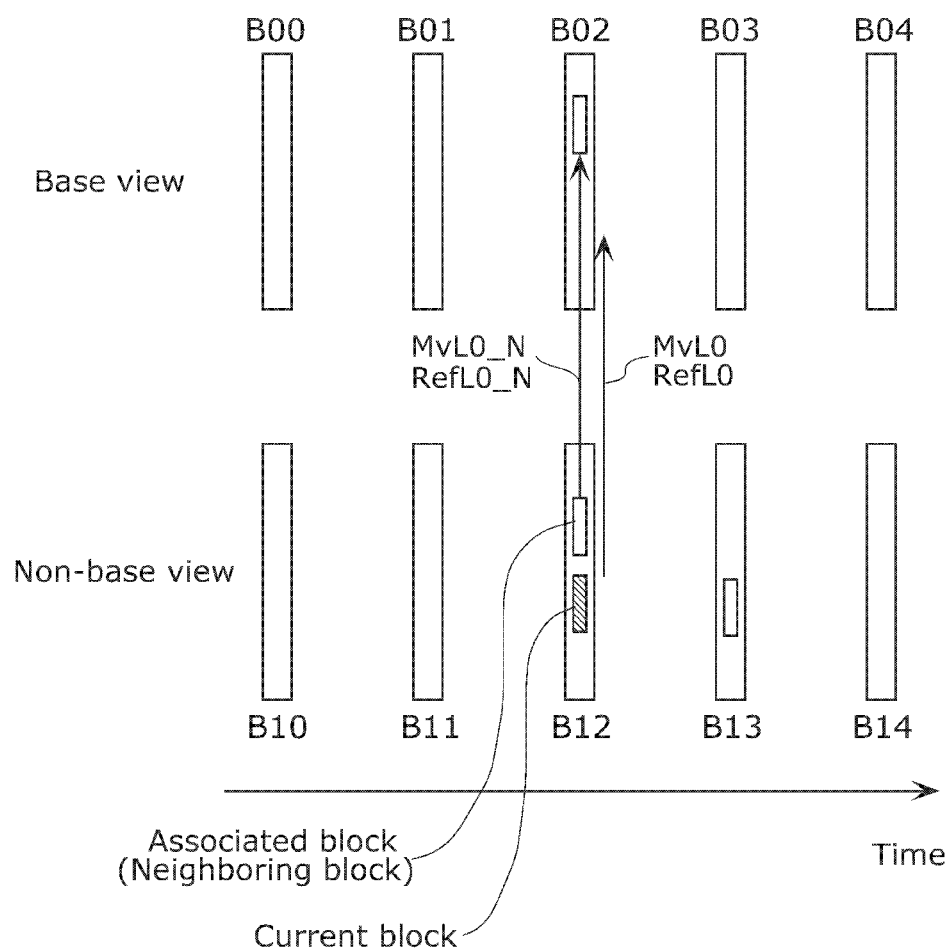
FIG. 25 shows a fifth example of the reference relationship according to Embodiment 1.

FIG. 25 shows a fifth example of the reference relationship according to this embodiment. FIG. 25 shows the two views: the base view and the non-base view, as in FIGS. 13 to 16. Furthermore, the plurality of pictures B00 to B04 in the base view and the plurality of pictures B10 to B14 in the non-base view are shown in display order.

In the example of FIG. 25, the reference picture index RefL0 of the block to be processed and the reference picture index RefL0_N of the neighboring block match. In this case, the temporal distance from the block to be processed to a reference picture thereof and the temporal distance from the neighboring block to a reference picture thereof match. Thus, there is no need to scale the motion vector MvL0_N of the neighboring block. Accordingly, in this case, the addition unit 131 of the image coding apparatus and the addition unit 231 of the image decoding apparatus may add the motion vector MvL0_N to the list without performing any processing on the motion vector MvL0_N.

Figure 26:
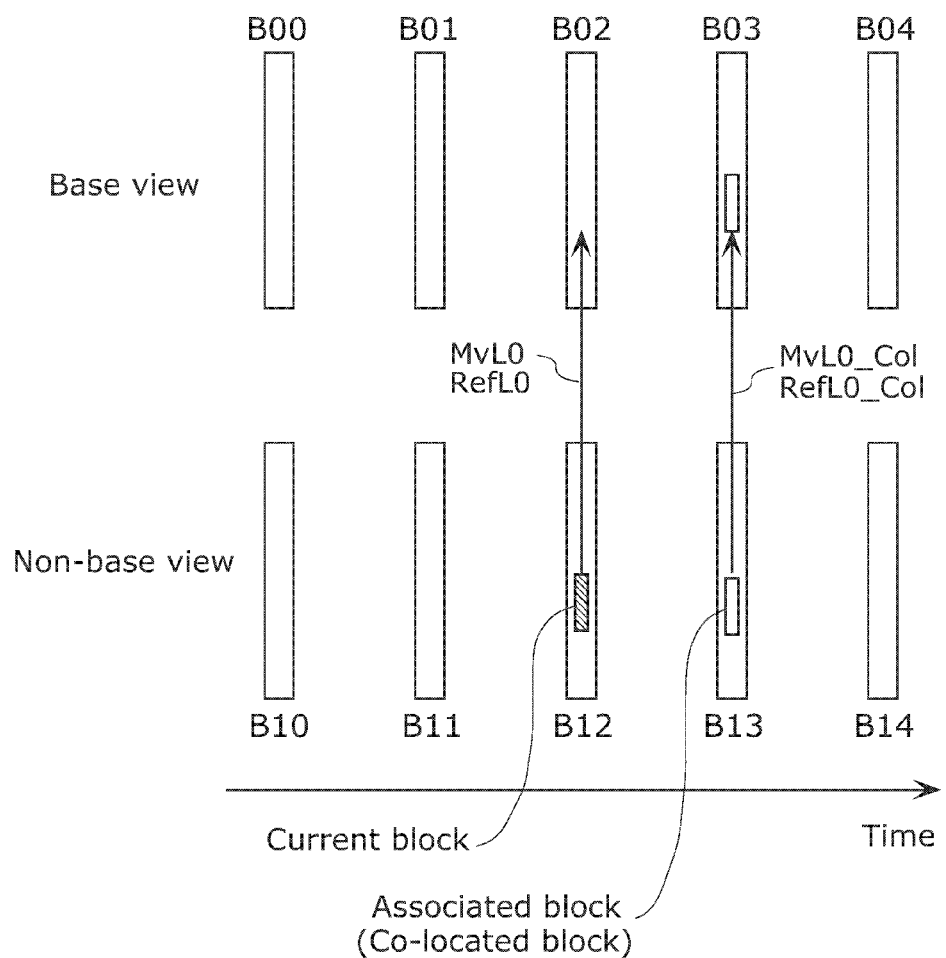
FIG. 26 shows a sixth example of the reference relationship according to Embodiment 1.

FIG. 26 shows a sixth example of the reference relationship according to this embodiment. FIG. 26 shows the two views: the base view and the non-base view, as in FIGS. 13 to 16. Furthermore, the plurality of pictures B00 to B04 in the base view and the plurality of pictures B10 to B14 in the non-base view are shown in display order.

In the example of FIG. 26, the temporal distance from the block to be processed to a reference picture thereof and the temporal distance from the co-located block to a reference picture thereof match. Thus, there is no need to scale the motion vector MvL0_Col of the co-located block. Accordingly, in this case, the addition unit 131 of the image coding apparatus and the addition unit 231 of the image decoding apparatus may add the motion vector MvL0_Col to the list without performing any processing on the motion vector MvL0_Col.

In the examples of FIGS. 25 and 26, the block to be processed and the reference picture of the block to be processed match temporally, and the associated block and the reference picture of the associated block match temporally. As described above, in such a case, the addition unit 131 of the image coding apparatus and the addition unit 231 of the image decoding apparatus may add the motion vector of the associated block to the list without performing any processing on the motion vector.

Furthermore, as above, the image coding apparatus according to this embodiment is an image coding apparatus which codes a plurality of blocks included in a plurality of pictures of an image and includes the addition unit 131, the selection unit 132, and the coding unit 101. These operations described above shall be described below for the purpose of confirmation.

The addition unit 131 determines, for each of one or more associated blocks that are one or more blocks included in a plurality of blocks, whether or not to add the motion vector of the associated block to the list. When it is determined that the motion vector of the associated block is to be added to the list, then the addition unit 131 adds the motion vector of the associated block to the list.

The selection unit 132 selects, from the list, a motion vector to be merged to a current block that is a block which is included in the plurality of blocks and is different from the one or more associated blocks.

The coding unit 101 merges, to the current block, the motion vector selected by the selection unit 132, and codes the current block using the merged motion vector as the motion vector of the current block.

Specifically, when an associated picture and an associated reference picture match temporally or when a current picture and a current reference picture match temporally, the addition unit 131 determines not to add the motion vector of the associated block to the list.

Here, the associated picture is a picture which includes the associated block. The associated reference picture is a picture which has been referred to using the motion vector of the associated block in coding of the associated block. The current picture is a picture which includes the current block. The current reference picture is a picture which is referred to using the motion vector of the current block in coding of the current block.

For example, when a view including the associated picture is different from a view including the associated reference picture or when a view including the current picture is different from a view including the current reference picture, the addition unit 131 may determine not to add the motion vector of the associated block to the list. Furthermore, for example, when the display order of the associated picture and the display order of the associated reference picture match or when the display order of the current picture and the display order of the current reference picture match, the addition unit 131 may determine not to add the motion vector of the associated block to the list.

Furthermore, for example, except when the associated picture and the associated reference picture match temporally and the current picture and the current associated picture match temporally, the addition unit 131 may determine not to add the motion vector of the associated block to the list. Furthermore, for example, the addition unit 131 may determine not to add the motion vector of the associated block to the list when only one of the following is true: a view including the associated picture is different from a view including the associated reference picture; and a view including the current picture is different from a view including the current reference picture.

Furthermore, for example, the addition unit 131 may add a predetermined motion vector to the list when the current picture and the current reference picture match temporally. Furthermore, for example, the addition unit 131 may add, to the list, a predetermined motion vector which is attached to a header of a coded stream. Furthermore, for example, the addition unit 131 may add, to the list, a disparity vector indicating a direction and a magnitude of disparity as the predetermined motion vector.

Furthermore, for example, the coding unit 101 may code the current block using a motion vector resulting from motion estimation and code the motion vector resulting from the motion estimation when no motion vector is added to the list.

Furthermore, for example, the addition unit 131 may scale the motion vector of the associated block using a ratio of the temporal distance between the current picture and the current reference picture to the temporal distance between the associated picture and the associated reference picture. Subsequently, the addition unit 131 may add the scaled motion vector to the list.

Furthermore, as above, the image decoding apparatus according to this embodiment is an image decoding apparatus which decodes a plurality of blocks included in a plurality of pictures of an image and includes the addition unit 231, the selection unit 232, and the decoding unit 201. These operations described above shall be described below for the purpose of confirmation.

The addition unit 231 determines, for each of one or more associated blocks that are one or more blocks included in a plurality of blocks, whether or not to add the motion vector of the associated block to the list. When it is determined that the motion vector of the associated block is to be added to the list, then the addition unit 231 adds the motion vector of the associated block to the list.

The selection unit 232 selects, from the list, a motion vector to be merged to a current block that is a block which is included in the plurality of blocks and is different from the one or more associated blocks. The decoding unit 201 merges, to the current block, the motion vector selected by the selection unit 232, and decodes the current block using the merged motion vector as the motion vector of the current block.

Specifically, when an associated picture and an associated reference picture match temporally or when a current picture and a current reference picture match temporally, the addition unit 231 determines not to add the motion vector of the associated block to the list.

Here, the associated picture is a picture which includes the associated block. The associated reference picture is a picture which has been referred to using the motion vector of the associated block in decoding of the associated block. The current picture is a picture which includes the current block. The current reference picture is a picture which is referred to using the motion vector of the current block in decoding of the current block.

For example, when a view including the associated picture is different from a view including the associated reference picture or when a view including the current picture is different from a view including the current reference picture, the addition unit 231 may determine not to add the motion vector of the associated block to the list. Furthermore, for example, when the display order of the associated picture and the display order of the associated reference picture match or when the display order of the current picture and the display order of the current reference picture match, the addition unit 231 may determine not to add the motion vector of the associated block to the list.

Furthermore, for example, except when the associated picture and the associated reference picture match temporally and the current picture and the current associated picture match temporally, the addition unit 231 may determine not to add the motion vector of the associated block to the list. Furthermore, for example, the addition unit 231 may determine not to add the motion vector of the associated block to the list when only one of the following is true: a view including the associated picture is different from a view including the associated reference picture; and a view including the current picture is different from a view including the current reference picture.

Furthermore, for example, the addition unit 231 may add a predetermined motion vector to the list when the current picture and the current reference picture match temporally. Furthermore, for example, the addition unit 231 may add, to the list, a predetermined motion vector which has been attached to a header of a coded stream. Furthermore, for example, the addition unit 231 may add, to the list, a disparity vector indicating a direction and a magnitude of disparity as the predetermined motion vector.

Furthermore, for example, the decoding unit 201 may decode the motion vector of the current block and decode the current block using the decoded motion vector when no motion vector is added to the list.

Furthermore, for example, the addition unit 231 may scale the motion vector of the associated block using a ratio of the temporal distance between the current picture and the current reference picture to the temporal distance between the associated picture and the associated reference picture. Subsequently, the addition unit 231 may add the scaled motion vector to the list.

Furthermore, the above-described image coding apparatus and the above-described decoding apparatus may be combined. For example, an image coding and decoding apparatus may include the above-described image coding apparatus and the above-described image decoding apparatus.

Furthermore, in the above-described embodiment, each structural element may be constituted by dedicated hardware or achieved by executing a software program suited to the structural element. Each structural element may be achieved by a program execution unit such as a CPU or a processor executing a software program recorded on a recording medium such as a hard disk or a semiconductor memory. Here, the software which achieves the image coding apparatus or the image decoding apparatus according to the above-described embodiment is the following program.

Specifically, this program causes a computer to execute an image coding method of coding a plurality of blocks included in a plurality of pictures of an image, the image coding method comprising: (i) determining, for each of one or more associated blocks, whether or not to add a motion vector of the associated block to a list, and (ii) adding the motion vector of the associated block to the list when determining that the motion vector of the associated block is to be added to the list, the one or more associated blocks being one or more blocks included in the plurality of blocks; selecting, from the list, a motion vector which is to be merged to a current block that is a block which is included in the plurality of blocks and is different from the one or more associated blocks; and (i) merging, to the current block, the motion vector selected in the selecting, and (ii) coding the current block using the merged motion vector as a motion vector of the current block, wherein, in the determining, it is determined that the motion vector of the associated block is not to be added to the list when an associated picture and an associated reference picture match temporally or when a current picture and a current reference picture match temporally, the associated picture being a picture including the associated block, the associated reference picture being a picture which is referred to using the motion vector of the associated block in coding of the associated block, the current picture being a picture including the current block, and the current reference picture being a picture which is referred to using the motion vector of the current block in the coding of the current block.

Furthermore, this program causes a computer to execute an image decoding method of decoding a plurality of blocks included in a plurality of pictures of an image, the image decoding method comprising: (i) determining, for each of one or more associated blocks, whether or not to add a motion vector of the associated block to a list, and (ii) adding the motion vector of the associated block to the list when determining that the motion vector of the associated block is to be added to the list, the one or more associated blocks being one or more blocks included in the plurality of blocks; selecting, from the list, a motion vector which is to be merged to a current block that is a block which is included in the plurality of blocks and is different from the one or more associated blocks; and (i) merging, to the current block, the motion vector selected in the selecting, and (ii) decoding the current block using the merged motion vector as a motion vector of the current block, wherein, in the determining, it is determined that the motion vector of the associated block is not to be added to the list when an associated picture and an associated reference picture match temporally or when a current picture and a current reference picture match temporally, the associated picture being a picture including the associated block, the associated reference picture being a picture which is referred to using the motion vector of the associated block in decoding of the associated block, the current picture being a picture including the current block, and the current reference picture being a picture which is referred to using the motion vector of the current block in the decoding of the current block.

Although the image coding apparatus and the image decoding apparatus according to one or more aspects of the inventive concepts have been described above, the herein disclosed subject matter is to be considered descriptive and illustrative only. Those skilled in the art will readily appreciate that the appended Claims are of a scope intended to cover and encompass not only the particular embodiments disclosed, but also equivalent structures, methods, and/or uses which are obtained by making various modifications in the embodiment and by arbitrarily combining the structural elements in the embodiment, without materially departing from the principles and spirit of the inventive concept.

For example, processing which is executed by a particular processing unit may be executed by another processing unit. Furthermore, the order to execute processes may be changed, and a plurality of processes may be executed in parallel.

Furthermore, the inventive concept can be implemented not only as the image coding apparatus and the image decoding apparatus, but also as a method which includes, as steps, the processing units included in each of the image coding apparatus and the image decoding apparatus. The inventive concept can be then implemented as a program for causing a computer to execute the steps included in the method. Furthermore, the inventive concept can be implemented as a computer-readable recording medium such as a compact disc read-only memory (CD-ROM) on which the program has been recorded.

A plurality of structural elements included in the image coding apparatus and the image decoding apparatus may be implemented as a large scale integration (LSI) that is an integrated circuit. These structural elements may be each provided on a single chip, and part or all of them may be formed into a single chip. The name used here is LSI, but it may also be called an integrated circuit (IC), system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed, or a reconfigurable processor that allows re-configuration of the connection or configuration of an LSI can be used for the same purpose.

In the future, with advancement in semiconductor technology, a brand-new technology may replace LSI. The structural elements included in the image coding apparatus and the image decoding apparatus can be integrated using such a technology.

(Embodiment 2)

The processing described in the above embodiment can be simply implemented in an independent computer system, by recording, in a recording medium, a program for implementing the configurations of the moving picture coding method (image coding method) and the moving picture decoding method (image decoding method) described in the above embodiment. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in the above embodiment and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 27:
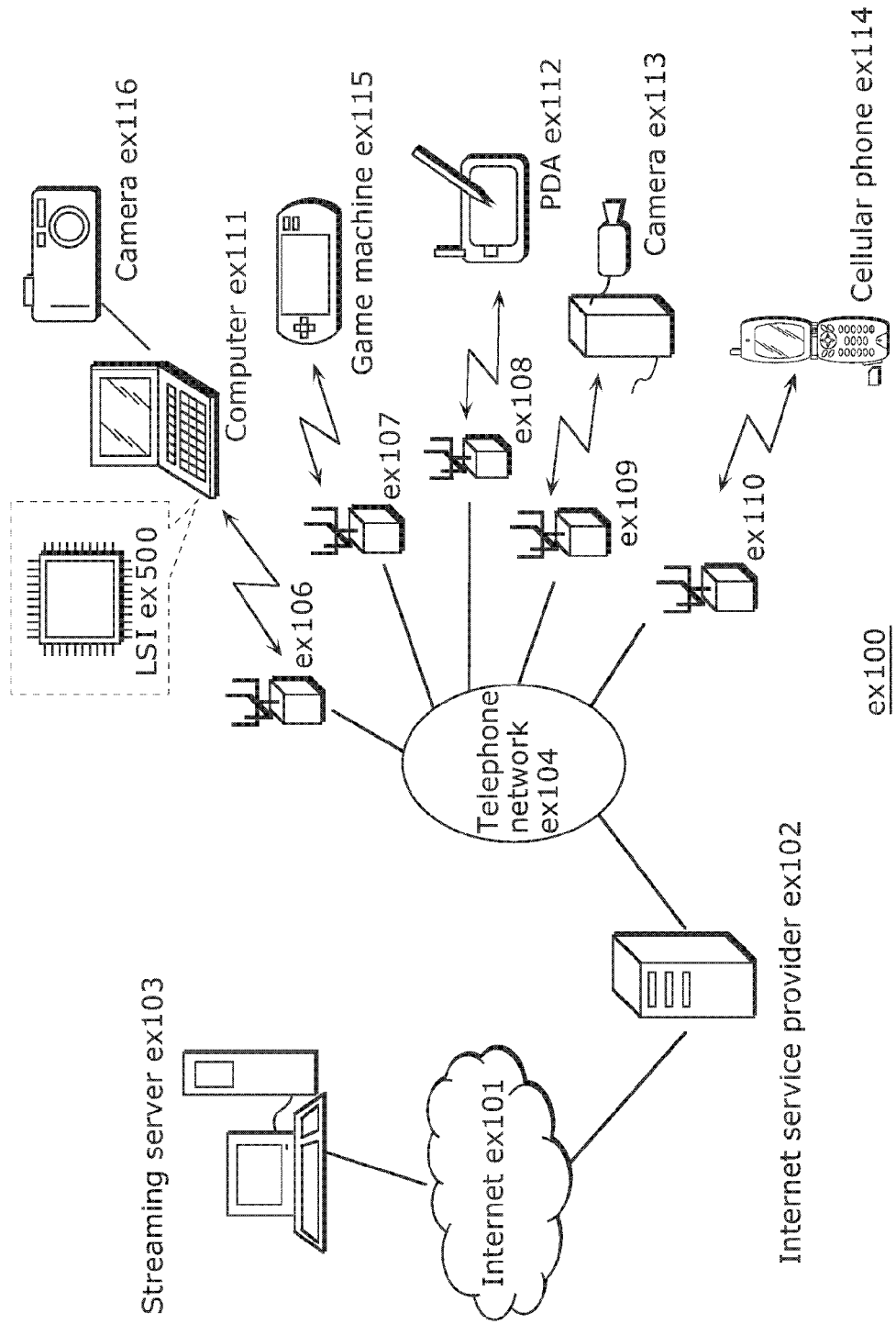
FIG. 27 shows an overall configuration of a content providing system for implementing content distribution services.

FIG. 27 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 27, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, content (for example, video of a music live show) captured by the user using the camera ex113 is coded as described above in the above embodiment (i.e., the camera functions as the image coding apparatus according to an embodiment disclosed herein), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an embodiment disclosed herein).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 28:
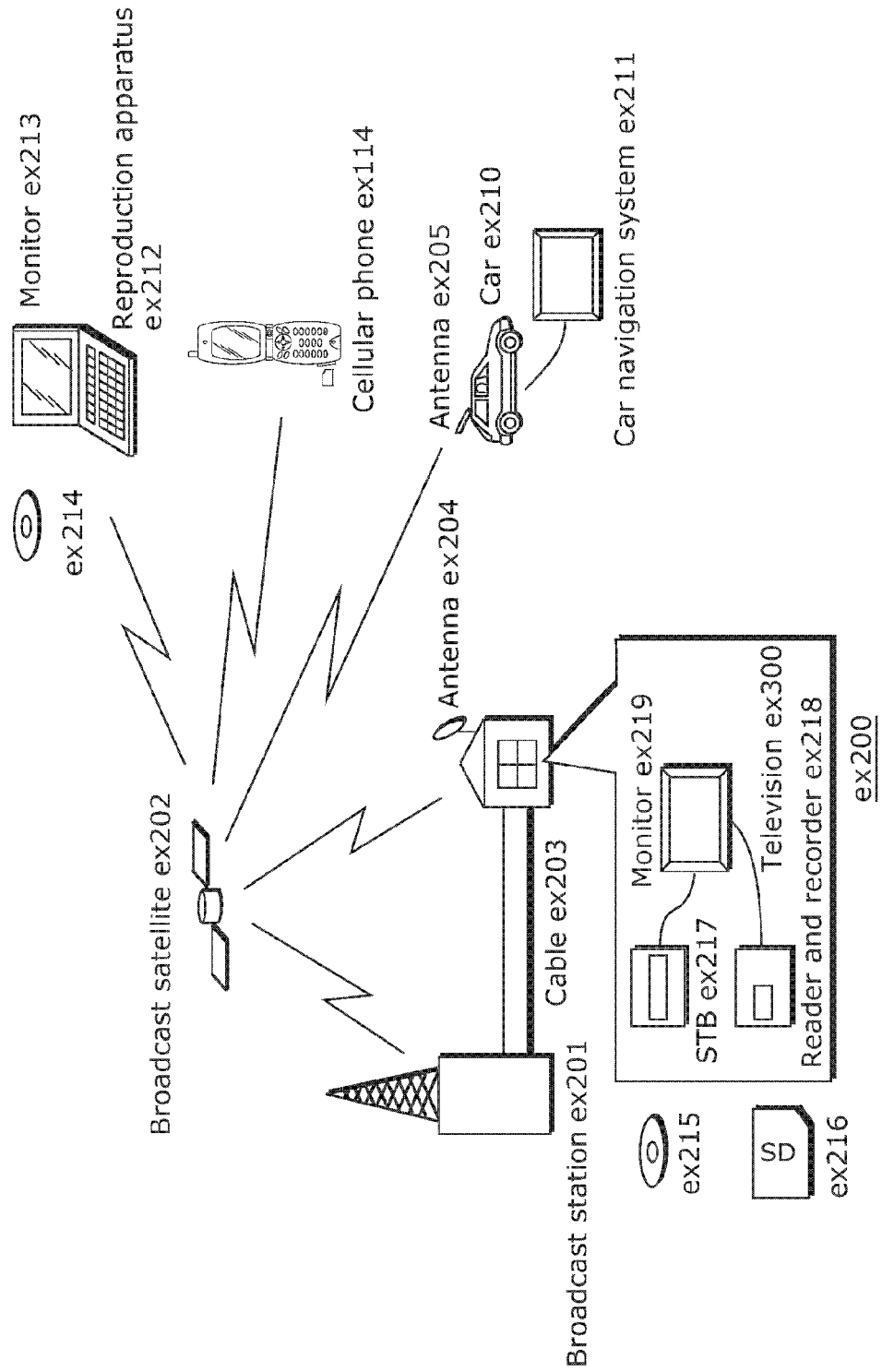
FIG. 28 shows an overall configuration of a digital broadcasting system.

Aside from the example of the content providing system ex100, at least one of the moving picture coding apparatus (image coding apparatus) and the moving picture decoding apparatus (image decoding apparatus) described in the above embodiment may be implemented in a digital broadcasting system ex200 illustrated in FIG. 28. More specifically, a broadcast station ex201 communicates or transmits, via radio waves to a broadcast satellite ex202, multiplexed data obtained by multiplexing audio data and others onto video data. The video data is data coded by the moving picture coding method described in the above embodiment (i.e., data coded by the image coding apparatus according to an embodiment disclosed herein). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an embodiment disclosed herein).

Furthermore, a reader/recorder ex218 (i) reads and decodes the multiplexed data recorded on a recording medium ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in the above embodiment. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 29:
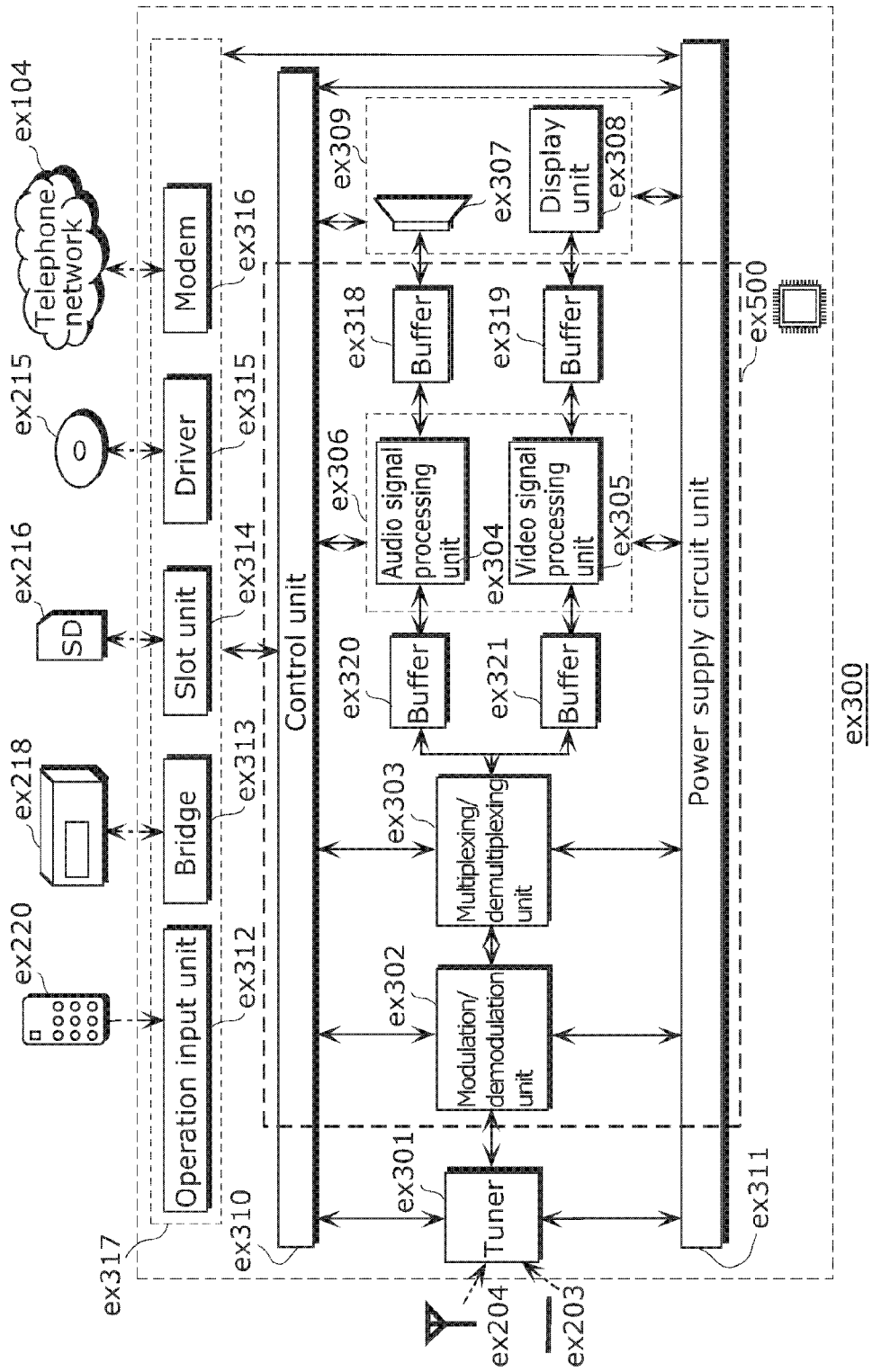
FIG. 29 shows a block diagram illustrating an example of a configuration of a television.

FIG. 29 illustrates the television (receiver) ex300 that uses the moving picture coding method and the moving picture decoding method described in the above embodiment. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to an embodiment disclosed herein); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in the above embodiment, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in the above embodiment. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 30:
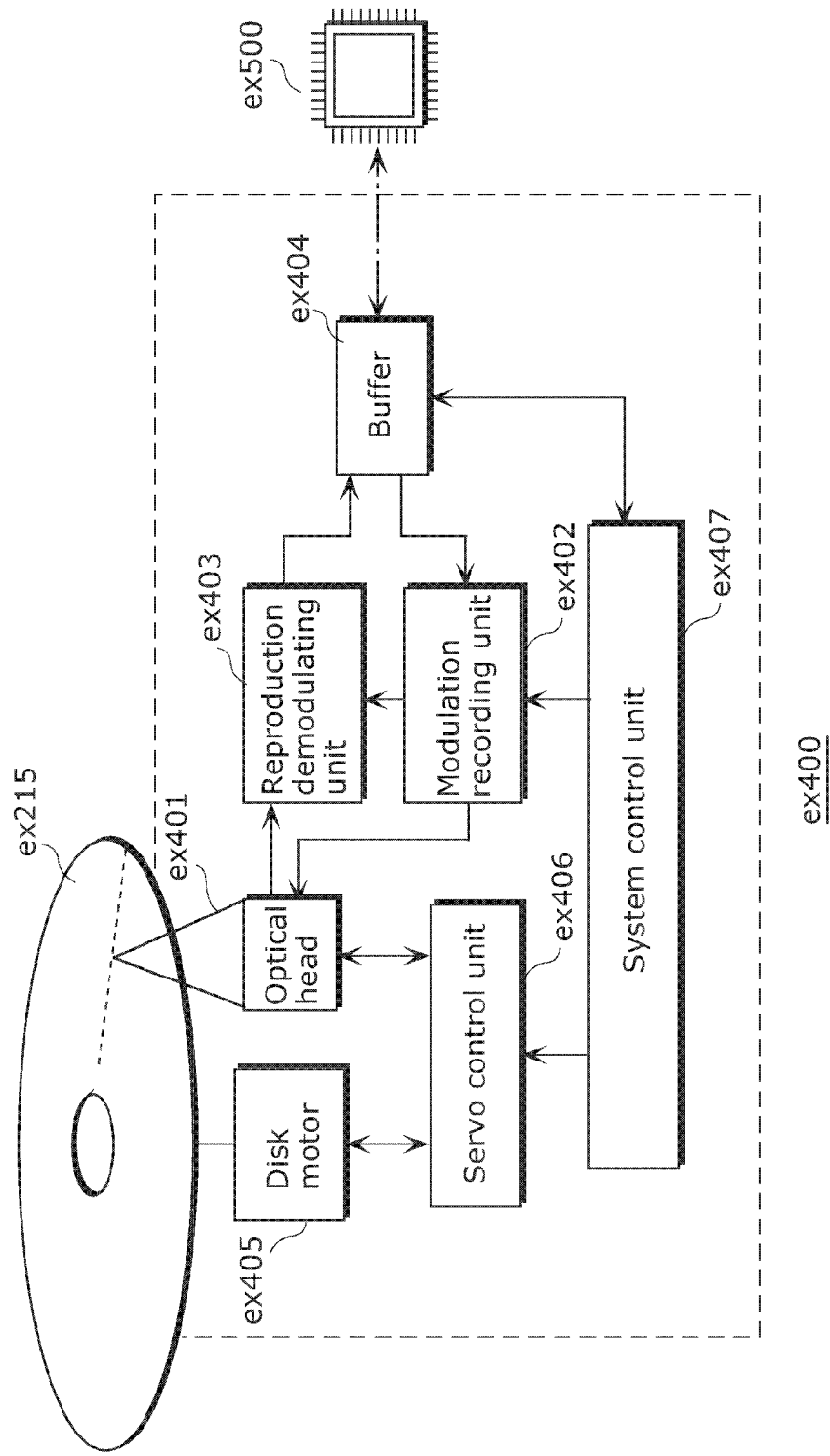
FIG. 30 shows a block diagram illustrating an example of a configuration of an information reproducing/recording unit that reads and writes information from and on a recording medium that is an optical disk.

As an example, FIG. 30 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 31:
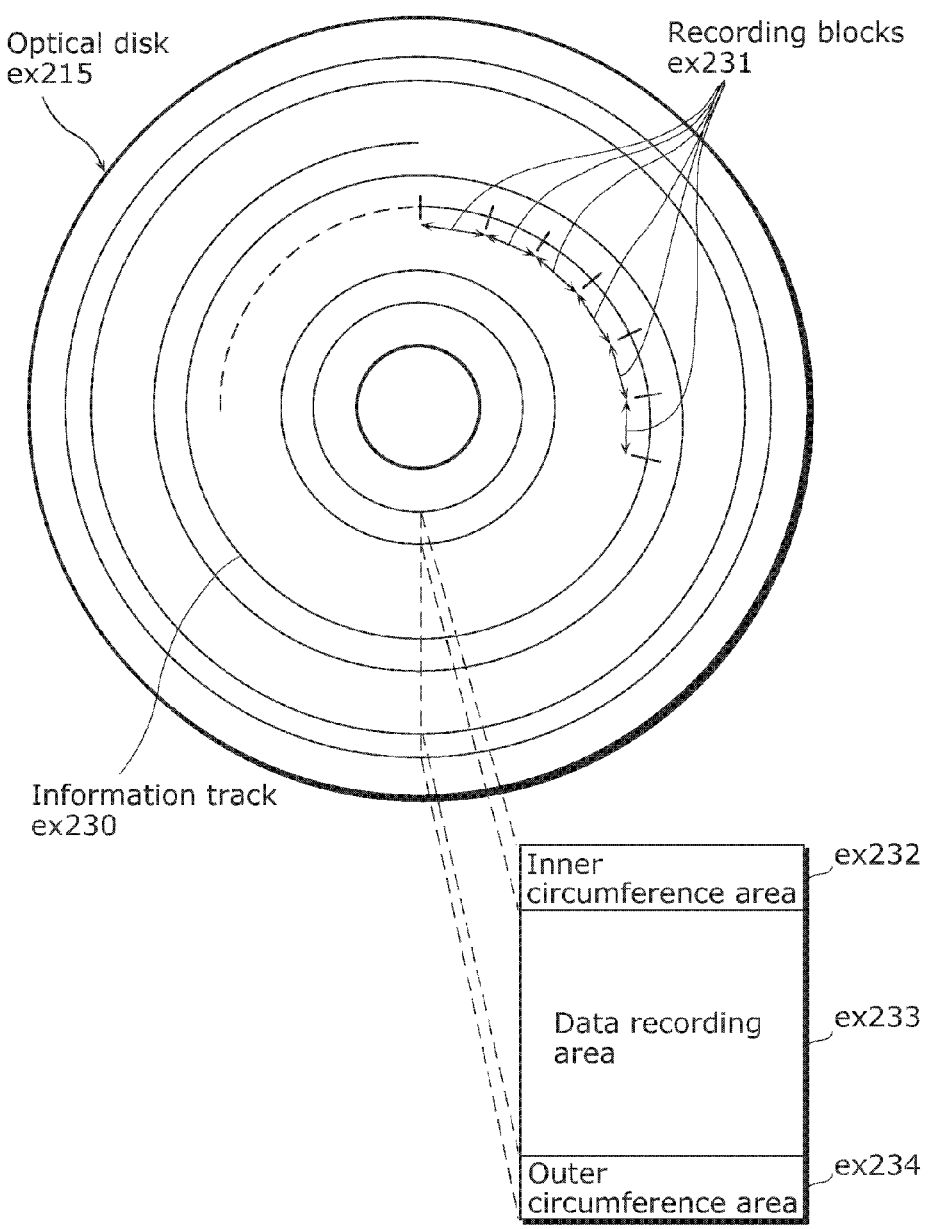
FIG. 31 shows an example of a configuration of a recording medium that is an optical disk.

FIG. 31 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 29.

The same will be true for the configuration of the computer ex111, the cellular phone ex114, and others.

Figure 32A:
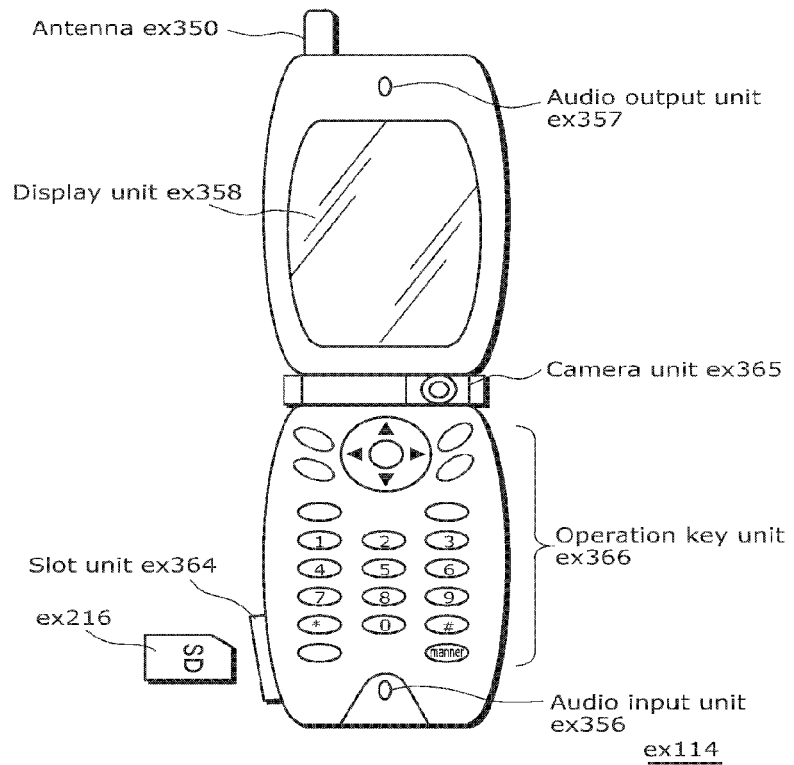
FIG. 32A shows an example of a cellular phone.

FIG. 32A illustrates the cellular phone ex114 that uses the moving picture coding method and the moving picture decoding method described in the above embodiment. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 32B:
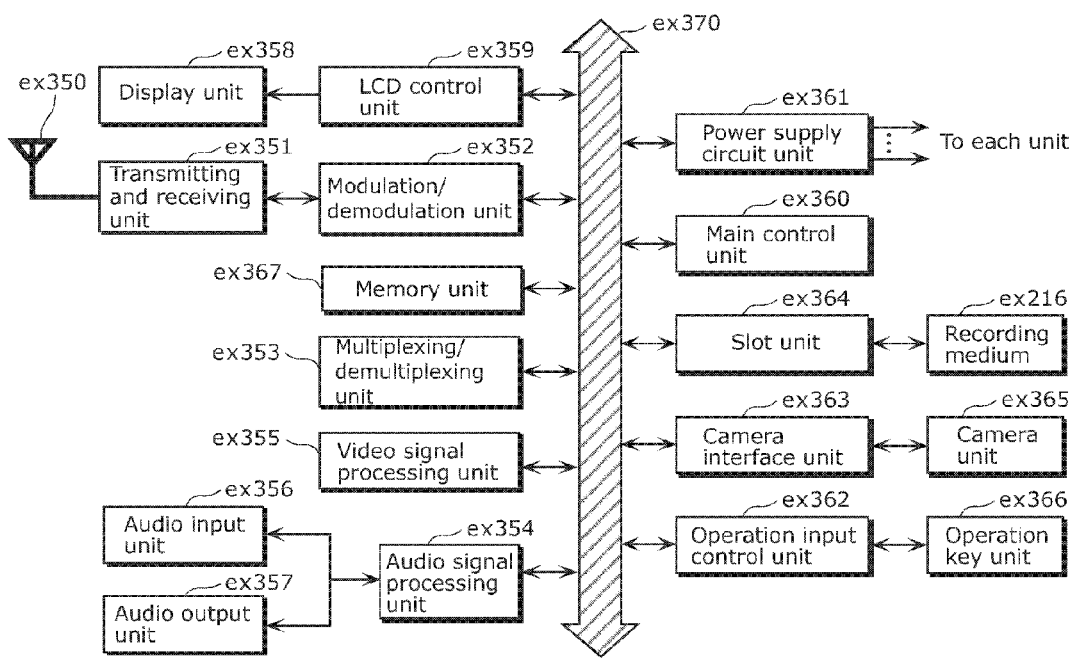
FIG. 32B is a block diagram showing an example of a configuration of a cellular phone.

Next, an example of a configuration of the cellular phone ex114 will be described with reference to FIG. 32B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in the above embodiment (i.e., functions as the image coding apparatus according to an embodiment disclosed herein), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in the above embodiment (i.e., functions as the image decoding apparatus according to an embodiment disclosed herein), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably has 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in the above embodiment can be used in any of the devices and systems described. Thus, the advantages described in the above embodiment can be obtained.

Furthermore, various modifications and revisions can be made in the above embodiment in the present disclosure without departing therefrom.

(Embodiment 3)

Video data can be generated by switching, as necessary, between (i) the moving picture coding method or the moving picture coding apparatus shown in the above embodiment and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in the above embodiment will be hereinafter described. The multiplexed data is a digital stream in the MPEG-2 Transport Stream format.

FIG. 33 illustrates a structure of the multiplexed data. As illustrated in FIG. 33, the multiplexed data can be obtained by multiplexing at least one of a video stream, an audio stream, a presentation graphics stream (PG), and an interactive graphics stream.

The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in the above embodiment, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM. Each stream included in the multiplexed data is identified by PID.

For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 34:
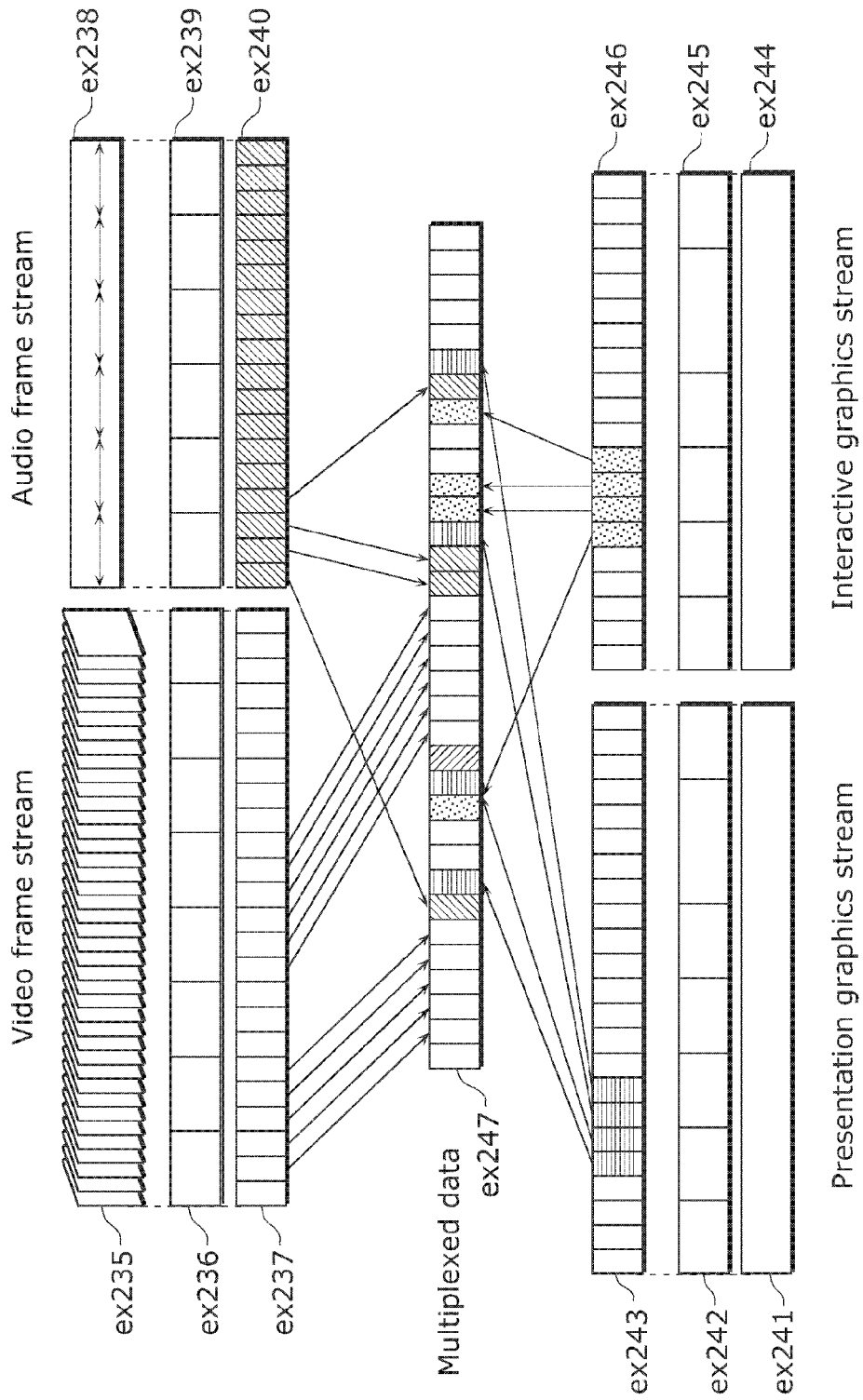
FIG. 34 schematically shows how each stream is multiplexed in multiplexed data.

FIG. 34 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 35:
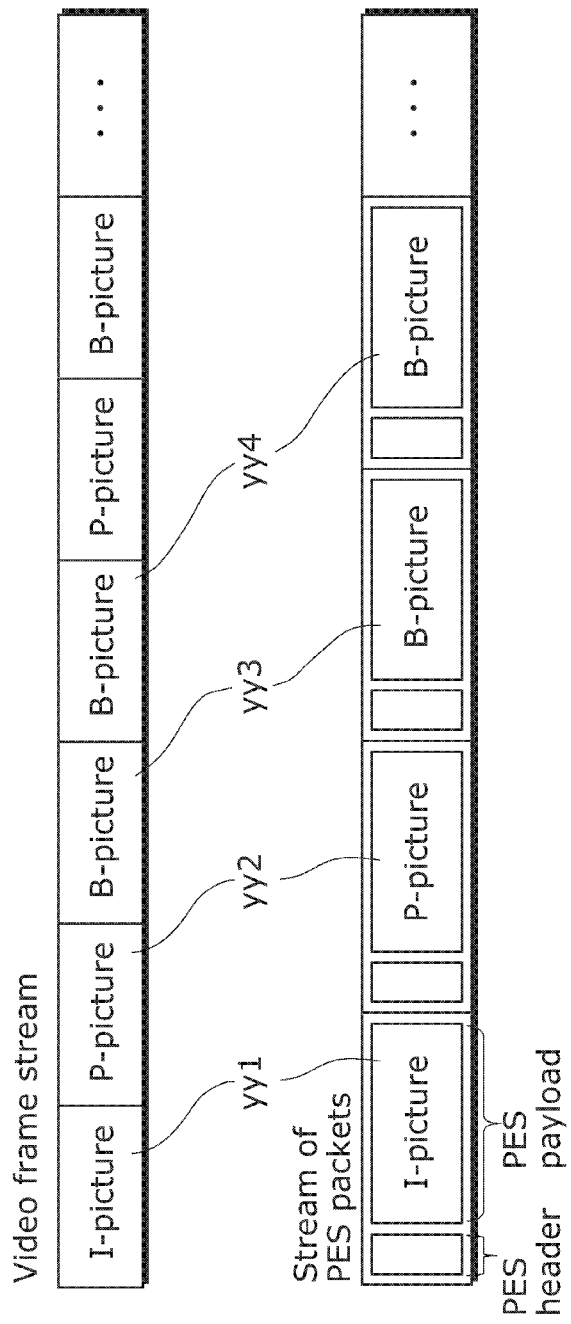
FIG. 35 shows how a video stream is stored in a stream of PES packets in more detail.

FIG. 35 illustrates how a video stream is stored in a stream of PES packets in more detail. The first bar in FIG. 35 shows a video frame stream in a video stream. The second bar shows the stream of PES packets. As indicated by arrows denoted as yy1, yy2, yy3, and yy4 in FIG. 35, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 36 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 36. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 37:
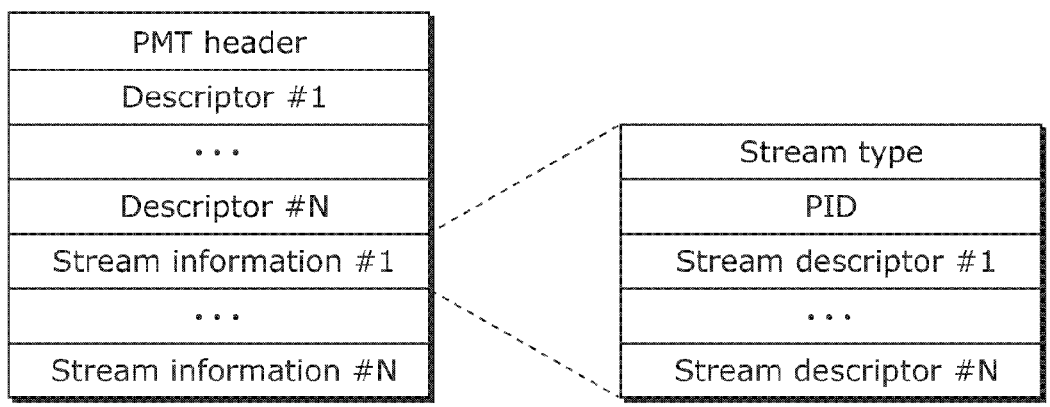
FIG. 37 shows a data structure of a PMT.

FIG. 37 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 38:
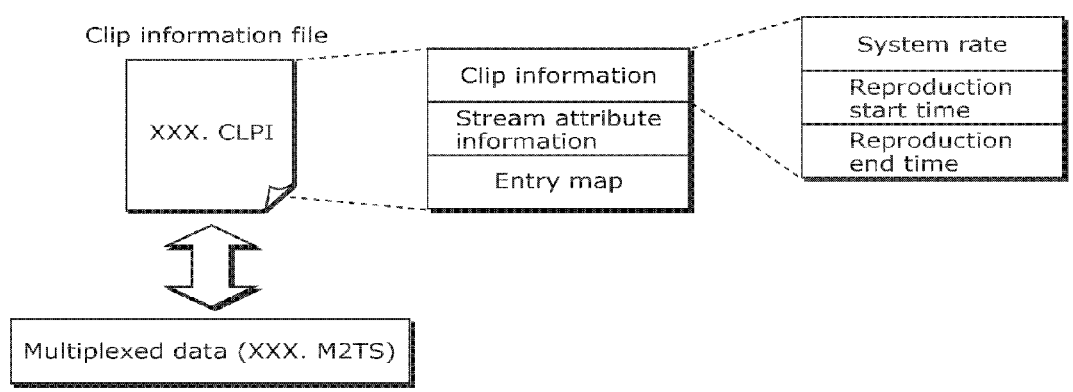
FIG. 38 shows an internal structure of multiplexed data information.

Each of the multiplexed data information files is management information of the multiplexed data as shown in FIG. 38. The multiplexed data information files are in one to one correspondence with the multiplexed data, and each of the files includes multiplexed data information, stream attribute information, and an entry map.

As illustrated in FIG. 38, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 39:
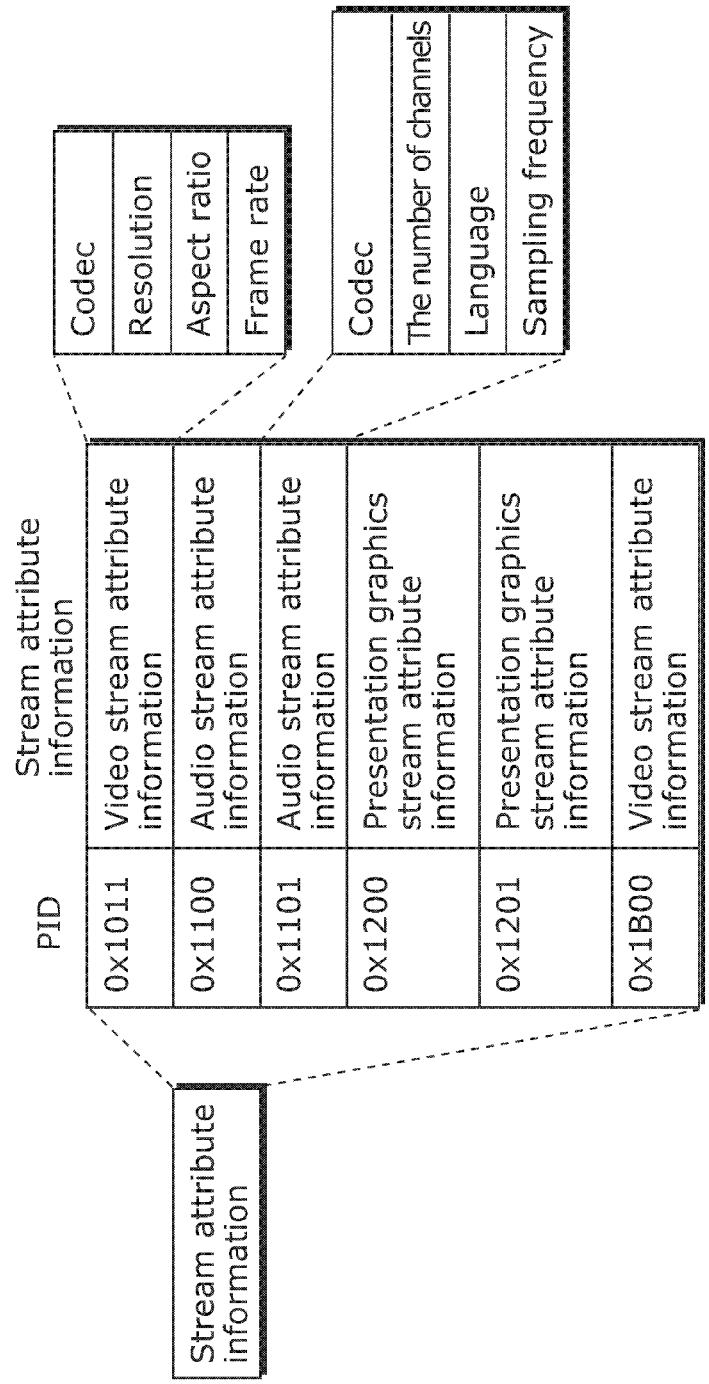
FIG. 39 shows an internal structure of stream attribute information.

As shown in FIG. 39, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in the above embodiment includes a step or a unit for allocating unique information indicating video data generated by the moving picture coding method or the moving picture coding apparatus in the above embodiment, to the stream type included in the PMT or the video stream attribute information. With the configuration, the video data generated by the moving picture coding method or the moving picture coding apparatus described in the above embodiment can be distinguished from video data that conforms to another standard.

Figure 40:
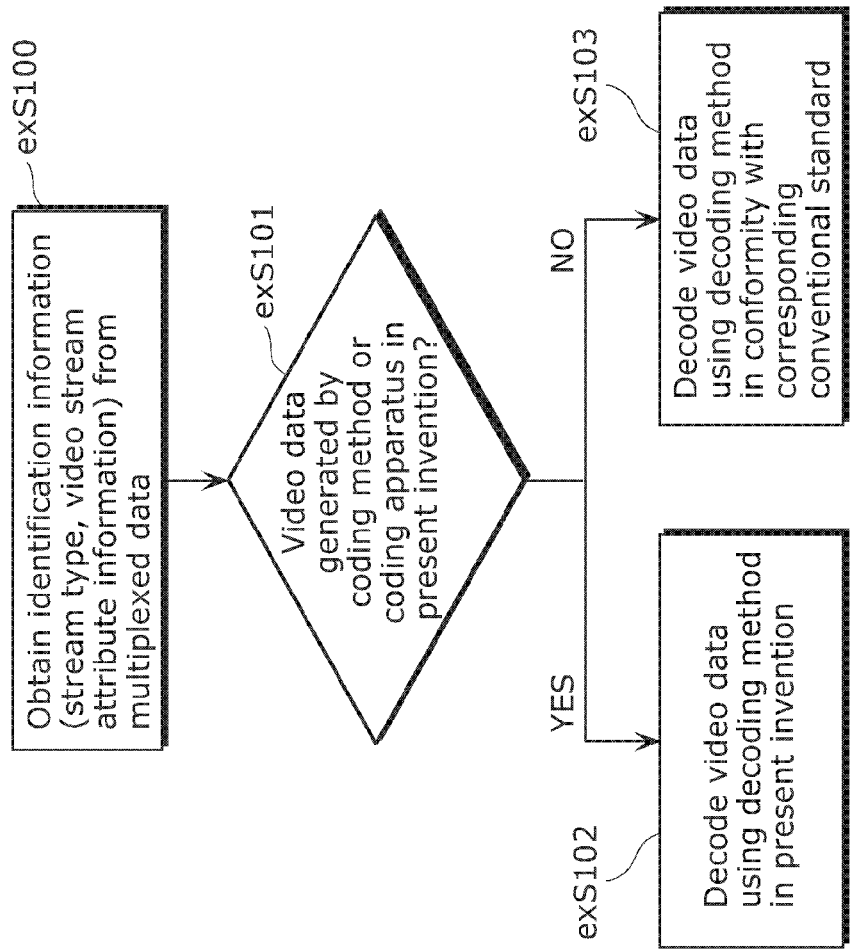
FIG. 40 shows steps for identifying video data.

Furthermore, FIG. 40 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in the above embodiment. When it is determined that the stream type or the video stream attribute information indicates that the multiplexed data is generated by the moving picture coding method or the moving picture coding apparatus in the above embodiment, in Step exS102, decoding is performed by the moving picture decoding method in the above embodiment. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in the above embodiment can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

(Embodiment 4)

Figure 41:
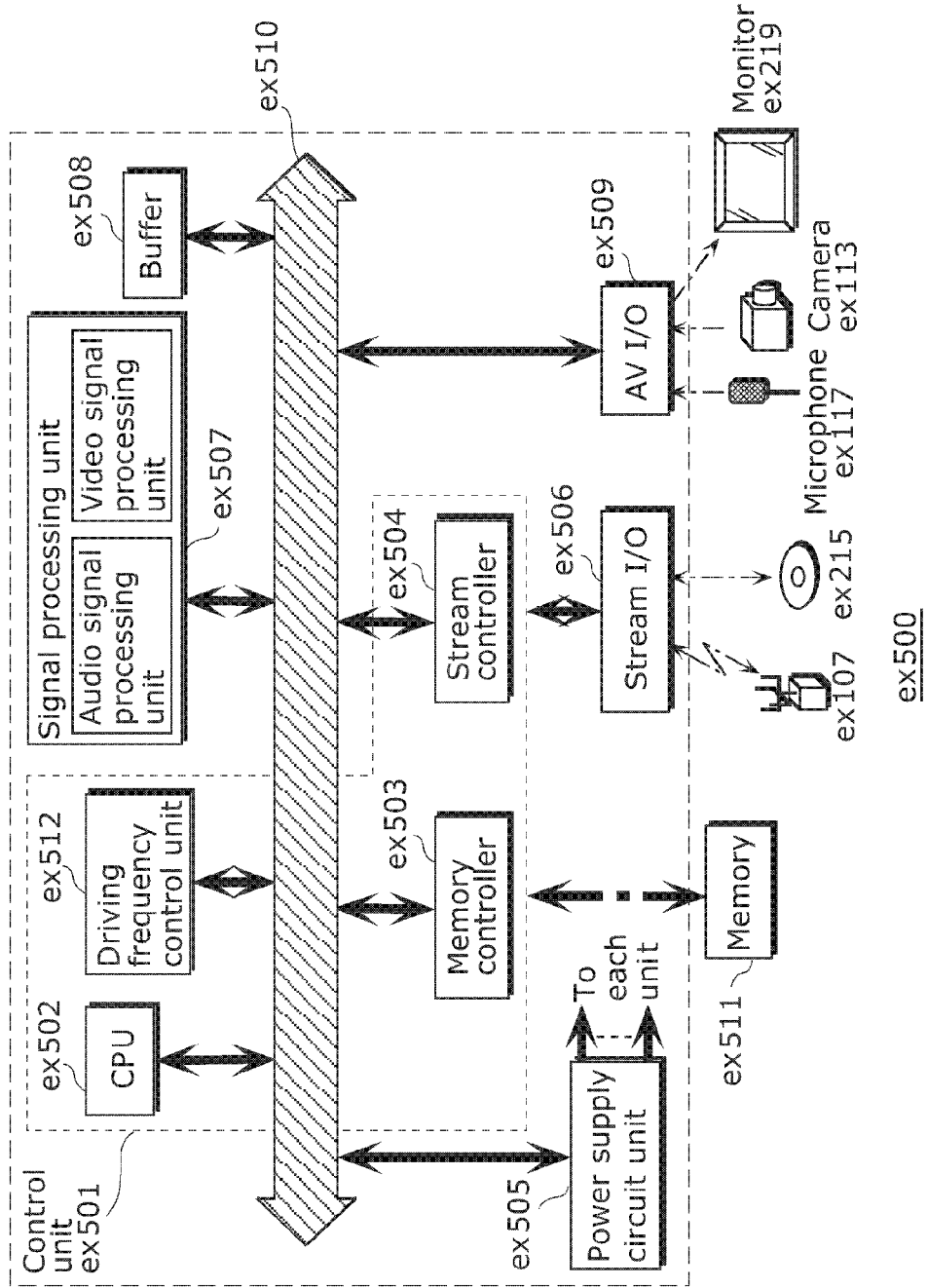
FIG. 41 is a block diagram showing an example of a configuration of an integrated circuit for implementing the moving picture coding method and the moving picture decoding method according to an embodiment.

Each of the moving picture coding method, the moving picture coding apparatus, the moving picture decoding method, and the moving picture decoding apparatus in the above embodiment is typically achieved in the form of an integrated circuit or a Large Scale Integrated (LSI) circuit. As an example of the LSI, FIG. 41 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in the above embodiment. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

(Embodiment 5)

When video data generated in the moving picture coding method or by the moving picture coding apparatus described in the above embodiment is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 42:
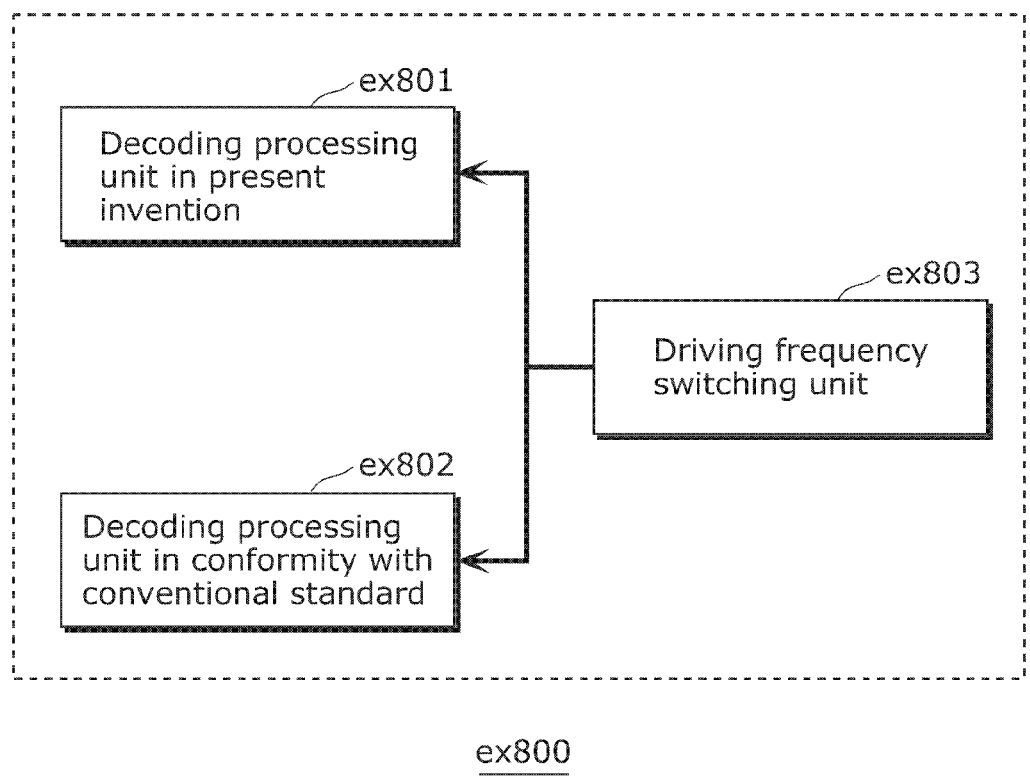
FIG. 42 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 42 illustrates a configuration ex800 in the present embodiment. A driving frequency switching unit ex803 sets a driving frequency to a higher driving frequency when video data is generated by the moving picture coding method or the moving picture coding apparatus described in the above embodiment. Then, the driving frequency switching unit ex803 instructs a decoding processing unit ex801 that executes the moving picture decoding method described in the above embodiment to decode the video data. When the video data conforms to the conventional standard, the driving frequency switching unit ex803 sets a driving frequency to a lower driving frequency than that of the video data generated by the moving picture coding method or the moving picture coding apparatus described in the above embodiment. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 41. Here, each of the decoding processing unit ex801 that executes the moving picture decoding method described in the above embodiment and the decoding processing unit ex802 that conforms to the conventional standard corresponds to the signal processing unit ex507 in FIG. 41. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 44. The driving frequency can be selected by storing the look-up table in the buffer ex508 and in an internal memory of an LSI, and with reference to the look-up table by the CPU ex502.

Figure 43:
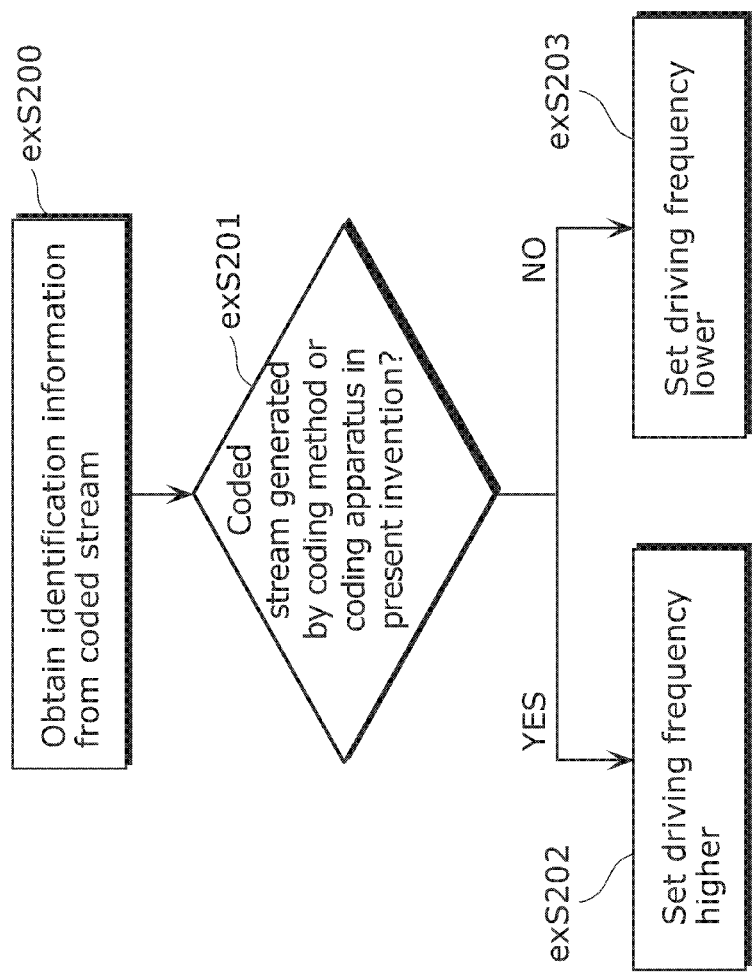
FIG. 43 shows steps for identifying video data and switching between driving frequencies.

FIG. 43 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in the above embodiment, based on the identification information. When the video data is generated by the moving picture coding method and the moving picture coding apparatus described in the above embodiment, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in the above embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in the above embodiment, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in the above embodiment, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in the above embodiment, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in the above embodiment, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

(Embodiment 6)

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 45A:
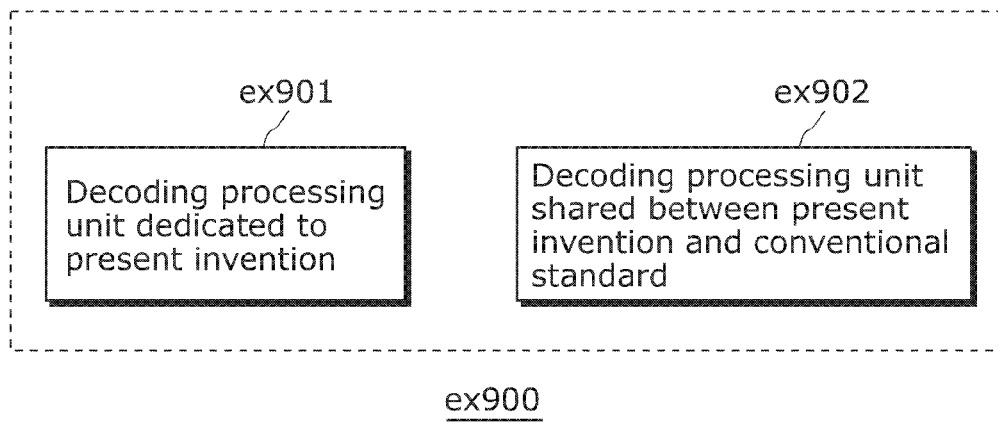
FIG. 45A is a diagram showing an example of a configuration for sharing a module of a signal processing unit.

In order to solve the problem, what is conceived is a configuration in which the decoding processing unit for implementing the moving picture decoding method described in the above embodiment and the decoding processing unit that conforms to the conventional standard, such as MPEG-2, MPEG-4 AVC, and VC-1 are partly shared. Ex900 in FIG. 45A shows an example of the configuration. For example, the moving picture decoding method described in the above embodiment and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an embodiment herein. Since an embodiment disclosed herein is characterized by motion compensation in particular, for example, the dedicated decoding processing unit ex901 is used for motion compensation. Otherwise, the decoding processing unit is probably shared for one of the entropy decoding, deblocking filtering, and inverse quantization, or all of the processing. The decoding processing unit for implementing the moving picture decoding method described in the above embodiment may be shared for the processing to be shared, and a dedicated decoding processing unit may be used for processing unique to that of MPEG-4 AVC.

Figure 45B:
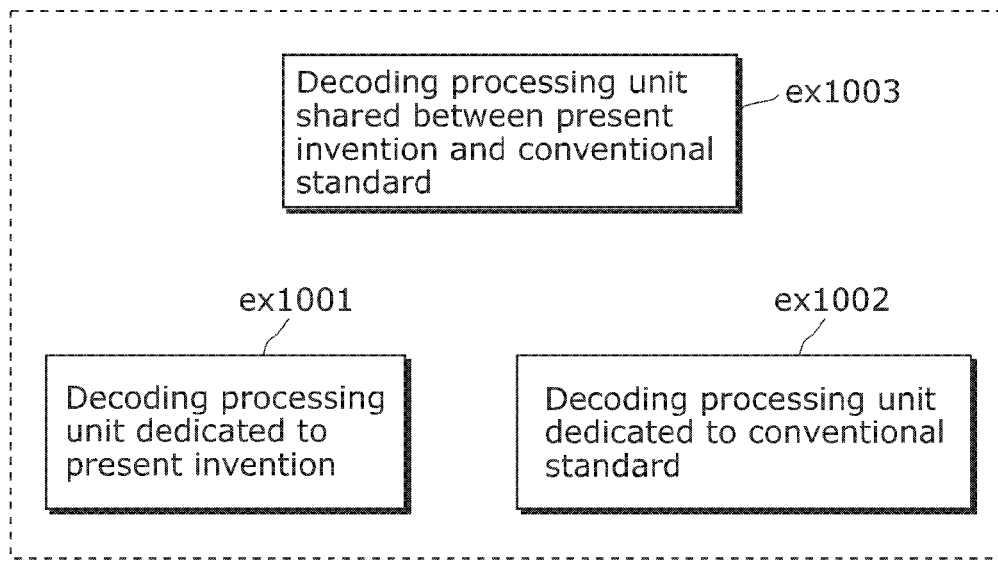
FIG. 45B is a diagram showing another example of a configuration for sharing a module of the signal processing unit.

Furthermore, ex1000 in FIG. 45B shows another example in that processing is partly shared. This example uses a configuration including a dedicated decoding processing unit ex1001 that supports the processing unique to an embodiment disclosed herein, a dedicated decoding processing unit ex1002 that supports the processing unique to another conventional standard, and a decoding processing unit ex1003 that supports processing to be shared between the moving picture decoding method according to an embodiment disclosed herein and the conventional moving picture decoding method. Here, the dedicated decoding processing units ex1001 and ex1002 are not necessarily specialized for the processing according to an embodiment disclosed herein and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to an embodiment disclosed herein and the moving picture decoding method in conformity with the conventional standard.

Industrial Applicability

The image coding method and the image decoding method consistent with one or more exemplary embodiments of the present disclosure are applicable to television receivers, digital video recorders, car navigation systems, cellular phones, digital cameras, or digital video cameras, for example.

The invention claimed is:

1. An image decoding method of decoding a plurality of blocks included in a plurality of pictures of an image, the image decoding method comprising:
 (i) determining, for each of one or more associated blocks, whether or not to add a motion vector of the associated block to a list, and (ii) adding the motion vector of the associated block to the list when determining that the motion vector of the associated block is to be added to the list, the one or more associated blocks being one or more blocks included in the plurality of blocks;
 selecting, from the list, a motion vector which is to be merged to a current block that is a block which is included in the plurality of blocks and is different from the one or more associated blocks; and
 (i) merging, to the current block, the motion vector selected in the selecting, and (ii) decoding the current block using the merged motion vector as a motion vector of the current block,
 wherein, in the determining, it is determined that the motion vector of the associated block is not to be added to the list when an associated picture and an associated reference picture match temporally or when a current picture and a current reference picture match temporally, the associated picture being a picture including the associated block, the associated reference picture being a picture which is referred to using the motion vector of the associated block in decoding of the associated block, the current picture being a picture including the current block, and the current reference picture being a picture which is referred to using the motion vector of the current block in the decoding of the current block.

2. The image decoding method according to claim 1, wherein, in the determining, it is determined that the motion vector of the associated block is not to be added to the list when a view including the associated picture is different from a view including the associated reference picture or when a view including the current picture is different from a view including the current reference picture, so as to determine that the motion vector of the associated block is not to be added to the list when the associated picture and the associated reference picture match temporally or when the current picture and the current reference picture match temporally.

3. The image decoding method according to claim 1, wherein, in the determining, it is determined that the motion vector of the associated block is not to be added to the list when a display order of the associated picture and a display order of the associated reference picture match or when a display order of the current picture and a display order of the current reference picture match, so as to determine that the motion vector of the associated block is not to be added to the list when the associated picture and the associated reference picture match temporally or when the current picture and the current reference picture match temporally.

4. The image decoding method according to claim 1, wherein, in the determining, it is determined that the motion vector of the associated block is not to be added to the list when the associated picture and the associated reference picture match temporally or when the current picture and the current associated reference picture match temporally except when the associated picture and the associated reference picture match temporally and the current picture and the current reference picture match temporally.

5. The image decoding method according to claim 1, wherein, in the determining, it is determined that the motion vector of the associated block is not to be added to the list when only one of the following is true: a view including the associated picture is different from a view including the associated reference picture; and a view including the current picture is different from a view including the current reference picture, so as to determine that the motion vector of the associated block is not to be added to the list when the associated picture and the associated reference picture match temporally or when the current picture and the current reference picture match temporally except when the associated picture and the associated reference picture match temporally and the current picture and the current reference picture match temporally.

6. The image decoding method according to claim 1, wherein, in the adding, a predetermined motion vector is added to the list when the current picture and the current reference picture match temporally.

7. The image decoding method according to claim 6, wherein, in the adding, the predetermined motion vector which has been attached to a header of a coded stream is added to the list.

8. The image decoding method according to claim 6, wherein, in the adding, a disparity vector indicating a direction and a magnitude of disparity is added to the list as the predetermined motion vector.

9. The image decoding method according to claim 1, wherein, in the decoding, the motion vector of the current block is decoded, and the current block is decoded using the decoded motion vector when no motion vector is added to the list.

10. The image decoding method according to claim 1, wherein, in the adding, the motion vector of the associated block is scaled using a ratio of a temporal distance between the current picture and the current reference picture to a temporal distance between the associated picture and the associated reference picture, and the scaled motion vector is added to the list.

11. An image decoding apparatus which decodes a plurality of blocks included in a plurality of pictures of an image, the image decoding apparatus comprising:
- an addition unit configured to (i) determine, for each of one or more associated blocks, whether or not to add a motion vector of the associated block to a list, and (ii) add the motion vector of the associated block to the list when determining that the motion vector of the associated block is to be added to the list, the one or more associated blocks being one or more blocks included in the plurality of blocks;
- a selection unit configured to select, from the list, a motion vector which is to be merged to a current block that is a block which is included in the plurality of blocks and is different from the one or more associated blocks; and
- a decoding unit configured to (i) merge, to the current block, the motion vector selected by the selection unit, and (ii) decode the current block using the merged motion vector as a motion vector of the current block, wherein the addition unit is configured to determine that the motion vector of the associated block is not to be added to the list when an associated picture and an associated reference picture match temporally or when a current picture and a current reference picture match temporally, the associated picture being a picture including the associated block, the associated reference picture being a picture which is referred to using the motion vector of the associated block in decoding of the associated block, the current picture being a picture including the current block, and the current reference picture being a picture which is referred to using the motion vector of the current block in the decoding of the current block.

* * * * *